(12) United States Patent
Miura et al.

(10) Patent No.: US 7,797,532 B2
(45) Date of Patent: Sep. 14, 2010

(54) DEVICE AUTHENTICATION SYSTEM

(75) Inventors: Takayuki Miura, Tokyo (JP); Jouji Abe, Kanagawa (JP); Taizo Shirai, Tokyo (JP); Masafumi Kusakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1130 days.

(21) Appl. No.: 10/569,731

(22) PCT Filed: Aug. 30, 2004

(86) PCT No.: PCT/JP2004/012882

§ 371 (c)(1),
(2), (4) Date: Feb. 28, 2006

(87) PCT Pub. No.: WO2005/025125

PCT Pub. Date: Mar. 17, 2005

(65) Prior Publication Data

US 2007/0083750 A1 Apr. 12, 2007

(30) Foreign Application Priority Data

Sep. 3, 2003 (JP) ............................. 2003-311855
Aug. 5, 2004 (JP) ............................. 2004-229280

(51) Int. Cl.
*H04L 9/00* (2006.01)
(52) U.S. Cl. ...................................... 713/156; 713/169
(58) Field of Classification Search .................. 713/155, 713/156, 168, 169
See application file for complete search history.

(56) References Cited

U.S. PATENT DOCUMENTS 5,903,882 A * 5/1999 Asay et al. .................... 705/44

7,523,490 B2 * 4/2009 Guo et al. ...................... 726/10

(Continued)

FOREIGN PATENT DOCUMENTS

JP 4-347949 12/1992

(Continued)

OTHER PUBLICATIONS

Menezes, A. J. Handbook of Applied Cryptography. (FL, CRC, 1997). pp. 352, 361, 493, 494, 499 (5 sheets). QA76.9.A25M463.*

(Continued)

*Primary Examiner*—Minh Dinh
(74) *Attorney, Agent, or Firm*—Oblon, Spivak, McClelland, Maier & Neustadt, L.L.P.

(57) ABSTRACT

Disclosed herein is a device authentication system capable of authenticating devices efficiently using the common key system. When a CE device requests service offerings from a service server, the service server in turn requests the CE device to be authenticated by a device authentication server. Given the request, the CE device causes the device authentication server to perform device authentication on that device and transmits the result of the device authentication to the service server. Upon receipt of the device authentication result from the CE device, the service server causes the device authentication server to check that the authentication has been performed correctly and then starts offering services to the CE device. The CE device and device authentication server share a pass phrase, and each of the two parties checks that the other party indeed retains the pass phrase for mutual authentication.

17 Claims, 12 Drawing Sheets

U.S. PATENT DOCUMENTS

| | | | |
|---|---|---|---|
| 7,565,537 B2 * | 7/2009 | Morais et al. | 713/169 |
| 2003/0084292 A1 * | 5/2003 | Pierce et al. | 713/168 |
| 2003/0163693 A1 * | 8/2003 | Medvinsky | 713/169 |

FOREIGN PATENT DOCUMENTS

| | | |
|---|---|---|
| JP | 10111897 | 4/1998 |
| JP | 2001-344214 | 12/2001 |
| JP | 2002101459 | 4/2002 |
| JP | 2002-368737 | 12/2002 |

OTHER PUBLICATIONS

Kohl et al., "The Evolution of the Kerberos Authentication Service", 1991, Retrieved from the Internet on Nov. 22, 2009: <URL: http://citeseerx.ist.psu.edu/viewdoc/summary?doi=10.1.1.115.8830>.*

David P. Kormann, et al., "Risks of the Passport single signon protocol", Computer Networks, XP004304758, vol. 33, 2000, pp. 51-58.

A. Menezes, et al., "Handbook of Applied Cryptography", Handbook of Applied Cryptography, XP002471042, 1997, pp. 546-549.

* cited by examiner

DEVICE AUTHENTICATION SYSTEM

TECHNICAL FIELD

The present invention relates generally to a device authentication system and more particularly to improvements for enhancing the efficiency of device authentication based on the common key system.

BACKGROUND ART

In recent years, CE (consumer electronics) devices have gained widespread acceptance. The CE devices illustratively include audio-visual equipment such as video decks, stereo units and TV sets; household appliances such as rice cookers and refrigerators, and other electronic devices, all incorporating computers that allow users to make use of services via networks.

Diverse service servers exist on the network. The CE devices can utilize the services offered by these servers.

For example, where the CE devices are audio-visual equipment such as video decks, stereo units and TV sets, service servers can transmit content to these devices.

It has been proposed that a toilet bowl equipped with sensors be arranged to constitute a CE device capable of analyzing signals derived from the user's stools in order to check the state of the user's health.

Thus there are varieties of CE devices and there exist numerous service servers offering services to these devices.

Before offering its service, a service server may request that the target CE device be authenticated as a valid destination for the services to be offered.

Each CE device stores a device ID constituting ID information specific to that device and a pass phrase which is secret information for use in device authentication. On the network exists a device authentication server that determines whether a given CE device is valid through the use of these pieces of information.

On receiving a device authentication request from the service server, a CE device requests the device authentication server to authenticate its own identify and transmits the result of the device authentication to the service server.

The service server accesses the device authentication server to check that the result of the device authentication is valid. Thereafter the service server offers its service to the target CE device.

When carrying out a device authentication process, the device authentication server and the CE device generally utilize an asymmetric key scheme involving a public key paired with a secret key for exchanging information.

There has been proposed a user mutual authentication device that performs device authentication using public keys (disclosed as Japanese Patent Laid-open No. 3278612). What follows is an outline of this invention:

Upon an initial connection from a client to a server, the two parties use each other's public key to encrypt and exchange random numbers and public key information for mutual authentication. The two parties agree at this point on the random numbers and public keys to be used for the subsequent communication. The random numbers and public keys used for the initial authentication are stored in storing means of the client and server.

Upon second-time and subsequent connections, the authentication-use random numbers in each other's storing means are encrypted using a public key and exchanged for mutual authentication of each other's identify.

The device authentication scheme using public and secrete keys has the disadvantage of causing both the target device and the device authentication server to perform numerous calculations. In particular, the device authentication server is subject to heavy computing loads because it is requested to authenticate a plurality of devices.

In case the secret key of the device authentication server leaks out, all devices using public keys corresponding to that secret key could be affected.

It is therefore an object of the present invention to provide a device authentication system and related resources for performing device authentication efficiently using the common key system.

DISCLOSURE OF INVENTION

In carrying out the present invention and according to one embodiment thereof, there is provided a device authentication system including a terminal device which stores predetermined secret information, a device authentication server which stores the secret information and authenticates the terminal device, and a service server which offers services to the terminal device authenticated by the device authentication server; wherein the device authentication server authenticates the terminal device by checking that server-specific information generated by the device authentication server is correctly encrypted by the terminal device using the secret information, whereas the terminal device authenticates the device authentication server by checking that terminal-specific information generated by the terminal device and encrypted using the secret information is correctly decrypted by the device authentication server; wherein either the terminal device or the device authentication server generates a session key following the authentication, encrypts the session key using the secret information, and transmits the encrypted session key to the other device so as to share the session key therebetween; wherein the device authentication server using the session key encrypts certificate information for certifying that the terminal device has been authenticated and transmits the encrypted certificate information to the terminal device; wherein the terminal device acquires the certificate information sent from the device authentication server by decrypting the encrypted certificate information using the session key, and transmits the acquired certificate information to the service server; and wherein the service server receives the certificate information from the terminal device and transmits the received certificate information to the device authentication server prompting the device authentication server to check that the certificate information is valid (first structure).

In the first structure according to the invention, the service server may preferably offer the services to the terminal device after causing the device authentication server to check that the certificate information sent from the terminal device is valid (second structure).

In the first structure according to the invention, the certificate information may preferably include identification information with which the device authentication server identifies a result of the device authentication of the terminal device, and encrypted identification information generated by encrypting the identification information using a server key specific to the device authentication server; and the device authentication server using the server key may preferably decrypt the certificate information received from the service server so as to acquire the encrypted identification information included in the certificate information, and determine whether the certificate information is valid by checking that the acquired identification information coincides with the identification information included in the received certificate information (third structure).

In the first structure according to the invention, either the terminal device or the device authentication server may preferably generate a second session key, encrypt the second session key using the secret information, and transmit the encrypted session key to the other device so as to share the second session key therebetween; the device authentication server may preferably convert the certificate information through a predetermined procedure using the second session key into detection information for detecting that the certificate information was not corrupted during communication, and transmit the detection information generated by the conversion to the terminal device; and the terminal device may preferably convert the acquired certificate information through the predetermined procedure using the second session key into detection information, and determine whether the received certificate information is not corrupted by checking that the detection information generated by the conversion coincides with the detection information received from the device authentication server (fourth structure).

According to another embodiment of the present invention, there is provided a device authentication server used in a device authentication system including a terminal device which stores predetermined secret information, a device authentication server which stores the secret information and authenticates the terminal device, and a service server which offers services to the terminal device authenticated by the device authentication server, the device authentication server including: request accepting means for accepting a request for device authentication from the terminal device; server-specific information transmitting means for transmitting server-specific information generated by the device authentication server to the terminal device from which the request is accepted; encrypted server-specific information receiving means for receiving from the terminal device the server-specific information encrypted by use of the secret information; device authenticating means for authenticating the terminal device by checking that the encrypted server-specific information received is (correctly) decrypted using the secret information; session key acquiring means for acquiring a session key to be shared with the terminal device, the session key being acquired either by receiving the session key from the terminal device in encrypted form based on the secret key in order to decrypt the received session key using the secret key, or by generating the session key and encrypting the generated session key using the secret key before transmitting the encrypted session key to the terminal device; certificate information transmitting means for transmitting to the terminal device certificate information for certifying that the terminal device has been authenticated by the device authenticating means, the certificate information being encrypted using the acquired session key for the transmission; and certificate information receiving means for receiving the certificate information from the service server which has acquired the certificate information from the terminal device (fifth structure). In the fifth structure according to the invention, the device authentication server may further include check result transmitting means for checking that the certificate information sent from the service server is valid and for transmitting a result of the check to the service server (sixth structure).

In the fifth structure according to the invention, the device authentication server may further include: terminal-specific information receiving means for receiving from the terminal device terminal-specific information generated by the terminal device and encrypted using the secret information; and terminal-specific information transmitting means for transmitting to the terminal device the terminal-specific information acquired by decrypting the received terminal-specific information using the secret information (seventh structure).

In the sixth structure according to the invention, the certificate information may preferably include identification information which identifies the result of the device authentication of the terminal device, and encrypted identification information generated by encrypting the identification information using a specific server key, the device authentication server further including: encrypted identification information decrypting means for decrypting the encrypted identification information using the server key, the encrypted identification information being included in the certificate information received from the service server; determining means for determining whether the decrypted identification information coincides with the identification information included in the received certificate information; and device authentication result identifying means for identifying the result of the device authentication using the identification information determined earlier; wherein the check result transmitting means may preferably transmit the result of the device authentication identified by the device authentication result identifying means (eighth structure).

In the fifth structure according to the invention, the device authentication server may further include: second session key acquiring means for acquiring a second session key to be shared with the terminal device, the second session key being acquired either by receiving the second session key from the terminal device in encrypted form based on the secret key in order to decrypt the received second session key using the secret key, or by generating the second session key and encrypting the generated second session key using the secret key before transmitting the encrypted second session key to the terminal device; and detection information generating means for generating detection information for detecting that the certificate information was not corrupted during communication, the detection information being generated by conversion from the certificate information through a predetermined procedure using the second session key; wherein the certificate information transmitting means may preferably transmit the detection information generated by the detection information generating means to the terminal device together with the certificate information (ninth structure).

In the fifth structure according to the invention, the device authentication server may further include: correspondence storing means for storing a correspondence between a device ID of the terminal device and the secret information stored by the terminal device; device ID receiving means for receiving the device ID from the terminal device from which the request has been accepted; and secret information identifying means for identifying the secret information corresponding to the device ID by searching for the received device ID through the correspondence storing means; wherein the device authenticating means may preferably encrypt the server-specific information using the identified secret information (tenth structure).

According to a further embodiment of the present invention, there is provided a terminal device used in a device authentication system including a terminal device which stores predetermined secret information, a device authentication server which stores the secret information and authenticates the terminal device, and a service server which offers services to the terminal device authenticated by the device authentication server, the terminal device including: requesting means for requesting device authentication from the device authentication server; encrypted server-specific information transmitting means for transmitting to the device authentication server server-specific information sent from the device authentication server in response to the request, the server-specific information being encrypted using the secret information for the transmission; session key acquiring means for acquiring a session key to be shared with the device authentication server, the session key being acquired either by receiving the session key from the device authentication server in encrypted form based on the secret key in order to decrypt the received session key using the secret key, or by generating the session key and encrypting the generated session key using the secret key before transmitting the encrypted session key to the device authentication server; certificate information receiving means for receiving from the device authentication server certificate information for certifying that the terminal device has been authenticated by the device authentication server, the certificate information being encrypted using the session key; and certificate information transmitting means for transmitting the received certificate information to the service server after decrypting the encrypted certificate information using the session key (eleventh structure).

In the eleventh structure according to the invention, the terminal device may further include: terminal-specific information transmitting means for transmitting to the device authentication server terminal-specific information generated and encrypted using the secret information; and server authenticating means for authenticating the device authenticating server by checking that the transmitted terminal-specific information has been decrypted by the device authentication server (twelfth structure).

In the eleventh structure according to the invention, the terminal device may further include: second session key acquiring means for acquiring a second session key to be shared with the device authentication server, the second session key being acquired either by receiving the second session key from the device authentication server in encrypted form based on the secret key in order to decrypt the received second session key using the secret key, or by generating the second session key and encrypting the generated second session key using the secret key before transmitting the encrypted second session key to the device authentication server; detection information receiving means for receiving from the device authentication server detection information for detecting that the certificate information was not corrupted during communication, the detection information being generated by conversion from the certificate information through a predetermined procedure using the second session key; detection information generating means for generating detection information by conversion from the received certificate information through the predetermined procedure using the acquired second session key; and determining means for determining whether the received certificate information is not corrupted by checking that the generated detection information coincides with the received detection information (thirteenth structure).

According to an even further embodiment of the present invention, there is provided a device authentication method for use with a device authentication server used in a device authentication system including a terminal device which stores predetermined secret information, a device authentication server which stores the secret information and authenticates the terminal device, and a service server which offers services to the terminal device authenticated by the device authentication server; wherein the device authentication server includes request accepting means, server-specific information transmitting means, encrypted server-specific information receiving means, device authenticating means, session key acquiring means, certificate information transmitting means, and certificate information receiving means, the device authentication method including the steps of: causing the request accepting means to accept a request for device authentication from the terminal device; causing the server-specific information transmitting means to transmit server-specific information generated by the device authentication server to the terminal device from which the request is accepted; causing the encrypted server-specific information receiving means to receive from the terminal device the server-specific information encrypted by use of the secret information; causing the device authenticating means to authenticate the terminal device by checking that the encrypted server-specific information received is correctly decrypted using the secret information; causing the session key acquiring means to acquire a session key to be shared with the terminal device, the session key being acquired either by receiving the session key from the terminal device in encrypted form based on the secret key in order to decrypt the received session key using the secret key, or by generating the session key and encrypting the generated session key using the secret key before transmitting the encrypted session key to the terminal device; causing the certificate information transmitting means to transmit to the terminal device certificate information for certifying that the terminal device has been authenticated by the device authenticating means, the certificate information being encrypted using the acquired session key for the transmission; and causing the certificate information receiving means to receive the certificate information from the service server which has acquired the certificate information from the terminal device (fourteenth structure).

In the fourteenth structure according to the invention, the device authentication server may preferably include check result transmitting means, the device authentication method further including the step of causing the check result transmitting means to check that the certificate information is valid and to transmit a result of the check to the service server (fifteenth structure).

In the fourteenth structure according to the invention, the device authentication server may preferably include terminal-specific information receiving means and terminal-specific information transmitting means, the device authentication method further including the steps of: causing the terminal-specific information receiving means to receive from the terminal device terminal-specific information generated by the terminal device and encrypted using the secret information; and causing the terminal-specific information transmitting means to transmit to the terminal device the terminal-specific information acquired by decrypting the received terminal-specific information using the secret information (sixteenth structure).

In the fifteenth structure according to the invention, the device authentication server may preferably include encrypted identification information decrypting means, determining means, and device authentication result identifying means; and the certificate information may preferably include identification information which identifies the result of the device authentication of the terminal device, and encrypted identification information generated by encrypting the identification information using a specific server key, the device authentication method further including the steps of: causing the encrypted identification information decrypting means to decrypt the encrypted identification information using the server key, the encrypted identification information being included in the certificate information received from the service server; causing the determining means to determine whether the decrypted identification information coincides with the identification information included in the received certificate information; and causing the device authentication result identifying means to identify the result of the device authentication using the identification information determined earlier; wherein the check result transmitting step may preferably transmit the result of the device authentication identified in the device authentication result identifying step (seventeenth structure).

In the fourteenth structure according to the invention, the device authentication server may preferably include second session key acquiring means and detection information generating means, the device authentication method further including the steps of: causing the second session key acquiring means to acquire a second session key to be shared with the terminal device, the second session key being acquired either by receiving the second session key from the terminal device in encrypted form based on the secret key in order to decrypt the received second session key using the secret key, or by generating the second session key and encrypting the generated second session key using the secret key before transmitting the encrypted second session key to the terminal device; and causing the detection information generating means to generate detection information for detecting that the certificate information was not corrupted during communication, the detection information being generated by conversion from the certificate information through a predetermined procedure using the second session key; wherein the certificate information transmitting step may preferably transmit the detection information generated in the detection information generating step to the terminal device together with the certificate information (eighteenth structure).

In the fourteenth structure according to the invention, the device authentication server may preferably include correspondence storing means for storing a correspondence between a device ID of the terminal device and the secret information stored by the terminal device, device ID receiving means, and secret information identifying means, the device authentication method further including the steps of: causing the device ID receiving means to receive the device ID from the terminal device from which the request has been accepted; and causing the secret information identifying means to identify the secret information corresponding to the device ID by searching for the received device ID through the correspondence storing means; wherein the device authenticating step may preferably encrypt the server-specific information using the identified secret information (twenty-first structure).

According to a still further embodiment of the present invention, there is provided a device authentication method for use with a terminal device used in a device authentication system including a terminal device which stores predetermined secret information, a device authentication server which stores the secret information and authenticates the terminal device, and a service server which offers services to the terminal device authenticated by the device authentication server; wherein the terminal device includes requesting means, encrypted server-specific information transmitting means, session key acquiring means, certificate information receiving means, and certificate information transmitting means, the device authentication method including the steps of: causing the requesting means to request device authentication from the device authentication server; causing the encrypted server-specific information transmitting means to transmit to the device authentication server server-specific information sent from the device authentication server in response to the request, the server-specific information being encrypted using the secret information for the transmission; causing the session key acquiring means to acquire a session key to be shared with the device authentication server, the session key being acquired either by receiving the session key from the device authentication server in encrypted form based on the secret key in order to decrypt the received session key using the secret key, or by generating the session key and encrypting the generated session key using the secret key before transmitting the encrypted session key to the device authentication server; causing the certificate information receiving means to receive from the device authentication server certificate information for certifying that the terminal device has been authenticated by the device authentication server, the certificate information being encrypted using the session key; and causing the certificate information transmitting means to transmit the received certificate information to the service server after decrypting the encrypted certificate information using the session key (twentieth structure).

In the twentieth structure according to the invention, the terminal device may preferably include terminal-specific information transmitting means and server authenticating means, the device authentication method further including the steps of: causing the terminal-specific information transmitting means to transmit to the device authentication server terminal-specific information generated and encrypted using the secret information; and causing the server authenticating means to authenticate the device authenticating server by checking that the transmitted terminal-specific information has been decrypted by the device authentication server (twenty-first structure).

In the twentieth structure according to the invention, the terminal device may preferably include second session key acquiring means, detection information receiving means, detection information generating means, and determining means, the device authentication method further including the steps of: causing the second session key acquiring means to acquire a second session key to be shared with the device authentication server, the second session key being acquired either by receiving the second session key from the device authentication server in encrypted form based on the secret key in order to decrypt the received second session key using the secret key, or by generating the second session key and encrypting the generated second session key using the secret key before transmitting the encrypted second session key to the device authentication server; causing the detection information receiving means to receive from the device authentication server detection information for detecting that the certificate information was not corrupted during communication, the detection information being generated by conversion from the certificate information through a predetermined procedure using the second session key; causing the detection information generating means to generate detection information by conversion from the received certificate information through the predetermined procedure using the acquired second session key; and causing the determining means to determine whether the received certificate information is not corrupted by checking that the generated detection information coincides with the received detection information (twenty-second structure).

According to a yet further embodiment of the present invention, there is provided a device authentication program for operating a device authentication server constituted by a computer and used in a device authentication system including a terminal device which stores predetermined secret information, a device authentication server which stores the secret information and authenticates the terminal device, and a service server which offers services to the terminal device authenticated by the device authentication server, the program causing the computer to carry out a procedure including: a request accepting function of accepting a request for device authentication from the terminal device; a server-specific information transmitting function of transmitting server-specific information generated by the device authentication server to the terminal device from which the request is accepted; an encrypted server-specific information receiving function of receiving from the terminal device the server-specific information encrypted by use of the secret information; a device authenticating function of authenticating the terminal device by checking that the encrypted server-specific information received is correctly decrypted using the secret information; a session key acquiring function of acquiring a session key to be shared with the terminal device, the session key being acquired either by receiving the session key from the terminal device in encrypted form based on the secret key in order to decrypt the received session key using the secret key, or by generating the session key and encrypting the generated session key using the secret key before transmitting the encrypted session key to the terminal device; a certificate information transmitting function of transmitting to the terminal device certificate information for certifying that the terminal device has been authenticated by the device authenticating means, the certificate information being encrypted using the acquired session key for the transmission; and a certificate information receiving function of receiving the certificate information from the service server which has acquired the certificate information from the terminal device (twenty-third structure).

In the twenty-third structure according to the invention, the procedure carried out on the computer may further include a check result transmitting function of checking that the certificate information is valid and of transmitting a result of the check to the service server (twenty-fourth structure).

In the twenty-third structure according to the invention, the procedure carried out on the computer may further include: a terminal-specific information receiving function of receiving from the terminal device terminal-specific information generated by the terminal device and encrypted using the secret information; and a terminal-specific information transmitting function of transmitting to the terminal device the terminal-specific information acquired by decrypting the received terminal-specific information using the secret information (twenty-fifth structure).

In the twenty-fourth structure according to the invention, the certificate information may preferably include identification information which identifies the result of the device authentication of the terminal device, and encrypted identification information generated by encrypting the identification information using a specific server key, the procedure further including: an encrypted identification information decrypting function of decrypting the encrypted identification information using the server key, the encrypted identification information being included in the certificate information received from the service server; a determining function of determining whether the decrypted identification information coincides with the identification information included in the received certificate information; and a device authentication result identifying function of identifying the result of the device authentication using the identification information determined earlier; wherein the check result transmitting function may preferably transmit the result of the device authentication identified by the device authentication result identifying function (twenty-sixth structure).

In the twenty-third structure according to the invention, the procedure may further include: a second session key acquiring function of acquiring a second session key to be shared with the terminal device, the second session key being acquired either by receiving the second session key from the terminal device in encrypted form based on the secret key in order to decrypt the received second session key using the secret key, or by generating the second session key and encrypting the generated second session key using the secret key before transmitting the encrypted second session key to the terminal device; and a detection information generating function of generating detection information for detecting that the certificate information was not corrupted during communication, the detection information being generated by conversion from the certificate information through a predetermined procedure using the second session key; wherein the certificate information transmitting function may preferably transmit the detection information generated by the detection information generating function to the terminal device together with the certificate information (twenty-seventh structure).

In the twenty-third structure according to the invention, the procedure may further include: a correspondence storing function of storing a correspondence between a device ID of the terminal device and the secret information stored by the terminal device; a device ID receiving function of receiving the device ID from the terminal device from which the request has been accepted; and a secret information identifying function of identifying the secret information corresponding to the device ID by searching for the received device ID through the correspondence storing means; wherein the device authenticating function may preferably encrypt the server-specific information using the identified secret information (twenty-eighth structure).

According to another embodiment of the present invention, there is provided a device authentication program for operating a terminal device constituted by a computer and used in a device authentication system including a terminal device which stores predetermined secret information, a device authentication server which stores the secret information and authenticates the terminal device, and a service server which offers services to the terminal device authenticated by the device authentication server, the device authentication program causing the computer to carry out a procedure including: a requesting function of requesting device authentication from the device authentication server; an encrypted server-specific information transmitting function of transmitting to the device authentication server server-specific information sent from the device authentication server in response to the request, the server-specific information being encrypted using the secret information for the transmission; a session key acquiring function of acquiring a session key to be shared with the device authentication server, the session key being acquired either by receiving the session key from the device authentication server in encrypted form based on the secret key in order to decrypt the received session key using the secret key, or by generating the session key and encrypting the generated session key using the secret key before transmitting the encrypted session key to the device authentication server; a certificate information receiving function of receiving from the device authentication server certificate information for certifying that the terminal device has been authenticated by the device authentication server, the certificate information being encrypted using the session key; and a certificate information transmitting function of transmitting the received certificate information to the service server after decrypting the encrypted certificate information using the session key (twenty-ninth structure).

In the twenty-ninth structure according to the invention, the procedure may further include: a terminal-specific information transmitting function of transmitting to the device authentication server terminal-specific information generated and encrypted using the secret information; and a server authenticating function of authenticating the device authenticating server by checking that the transmitted terminal-specific information has been decrypted by the device authentication server (thirtieth structure).

In the thirtieth structure according to the invention, the procedure may further include: a second session key acquiring function of acquiring a second session key to be shared with the device authentication server, the second session key being acquired either by receiving the second session key from the device authentication server in encrypted form based on the secret key in order to decrypt the received second session key using the secret key, or by generating the second session key and encrypting the generated second session key using the secret key before transmitting the encrypted second session key to the device authentication server; a detection information receiving function of receiving from the device authentication server detection information for detecting that the certificate information was not corrupted during communication, the detection information being generated by conversion from the certificate information through a predetermined procedure using the second session key; a detection information generating function of generating detection information by conversion from the received certificate information through the predetermined procedure using the acquired second session key; and a determining function of determining whether the received certificate information is not corrupted by checking that the generated detection information coincides with the received detection information (thirty-first structure).

According to a further embodiment of the present invention, there is provided a storage medium which stores in computer-readable fashion a device authentication program for operating a device authentication server constituted by a computer and used in a device authentication system including a terminal device which stores predetermined secret information, a device authentication server which stores the secret information and authenticates the terminal device, and a service server which offers services to the terminal device authenticated by the device authentication server, the program causing the computer to carry out a procedure including: a request accepting function of accepting a request for device authentication from the terminal device; a server-specific information transmitting function of transmitting server-specific information generated by the device authentication server to the terminal device from which the request is accepted; an encrypted server-specific information receiving function of receiving from the terminal device the server-specific information encrypted by use of the secret information; a device authenticating function of authenticating the terminal device by checking that the encrypted server-specific information received is correctly decrypted using the secret information; a session key acquiring function of acquiring a session key to be shared with the terminal device, the session key being acquired either by receiving the session key from the terminal device in encrypted form based on the secret key in order to decrypt the received session key using the secret key, or by generating the session key and encrypting the generated session key using the secret key before transmitting the encrypted session key to the terminal device; a certificate information transmitting function of transmitting to the terminal device certificate information for certifying that the terminal device has been authenticated by the device authenticating means, the certificate information being encrypted using the acquired session key for the transmission; and a certificate information receiving function of receiving the certificate information from the service server which has acquired the certificate information from the terminal device (thirty-second structure).

According to an even further embodiment of the present invention, there is provided a storage medium which stores in computer-readable fashion a device authentication program for operating a terminal device constituted by a computer and used in a device authentication system including a terminal device which stores predetermined secret information, a device authentication server which stores the secret information and authenticates the terminal device, and a service server which offers services to the terminal device authenticated by the device authentication server, the device authentication program causing the computer to carry out a procedure including: a requesting function of requesting device authentication from the device authentication server; an encrypted server-specific information transmitting function of transmitting to the device authentication server server-specific information sent from the device authentication server in response to the request, the server-specific information being encrypted using the secret information for the transmission; a session key acquiring function of acquiring a session key to be shared with the device authentication server, the session key being acquired either by receiving the session key from the device authentication server in encrypted form based on the secret key in order to decrypt the received session key using the secret key, or by generating the session key and encrypting the generated session key using the secret key before transmitting the encrypted session key to the device authentication server; a certificate information receiving function of receiving from the device authentication server certificate information for certifying that the terminal device has been authenticated by the device authentication server, the certificate information being encrypted using the session key; and a certificate information transmitting function of transmitting the received certificate information to the service server after decrypting the encrypted certificate information using the session key (thirty-third structure).

The above-outlined embodiments of the present invention permit device authentication efficiently using the common key scheme.

BEST MODE FOR CARRYING OUT THE INVENTION

Outline of a Preferred Embodiment

Figure 1:
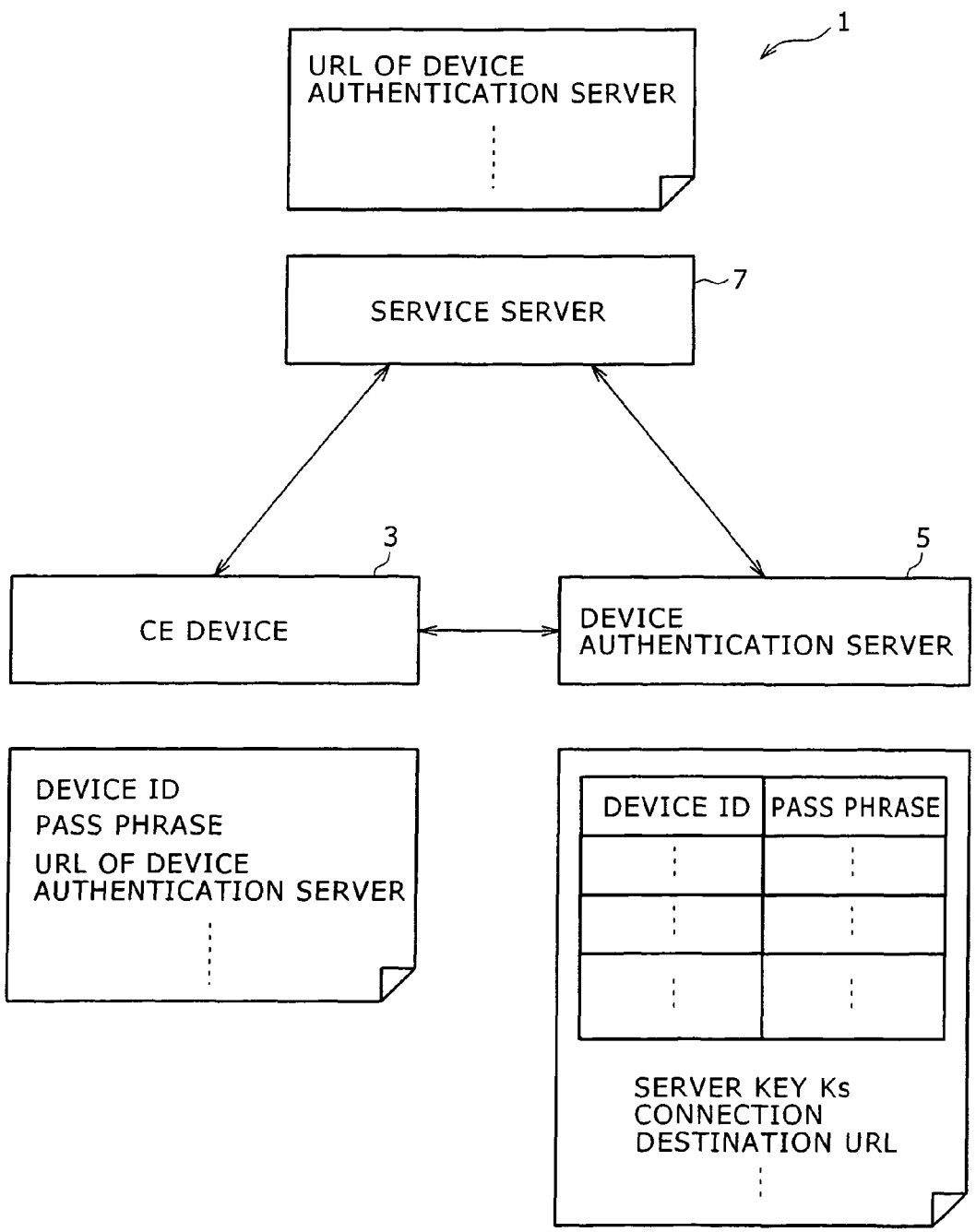
FIG. 1 is a schematic view showing a typical configuration of a device authentication system embodying the present invention.

A device authentication system practiced as one preferred embodiment of the present invention is made up of a CE device, a service server that offers services to the CE device, and a device authentication that authenticates the CE device.

When the CE device requests service offerings from the service server, the service server in turn requests the CE device to have itself authenticated by the device authentication server.

Given the request, the CE device requests the device authentication server to carry out relevant device authentication. The result of the authentication is transmitted by the CE device to the service server.

The service server receives the result of the device authentication from the CE device, and requests the device authentication server to verify that the CE device has indeed been authenticated by the device authentication server. After the verification, the service server starts offering its services to the CE device.

The CE device and device authentication server share a pass phrase. The two sides authenticate each other by checking that the other party retains the same pass phrase.

The pass phrase is checked first by each of the two parties getting a random number encrypted using the pass phrase and transmitting the encrypted random number to the other party. The other party then decrypts the received random number using the pass phrase and checks to determine whether the original random number is acquired. In this case, the pass phrase is used as a common key.

When one of the two parties transmits the random number in encrypted form to the other party, a session key is also generated and encrypted using the pass phrase before being sent to the other party. After the pass phrase is verified, the session key is used as the common key for subsequent communications.

The session key may be generated by any of the parties involved. With this embodiment, the device authentication server is arranged to generate the session key and send it to the CE device.

After verification of the pass phrase, as outlined above, the session key may be used as the common key. This scheme has the advantage of limiting the use of the pass phrase to device authentication only.

Having recourse to the common key system for device authentication significantly enhances the efficiency of processing.

At a rough estimate, the information processing load due to symmetric key cryptography (i.e., a scheme under which the same key information such as a common key is used for both encryption and decryption) is less than one-hundredth of the load attributable to asymmetric key cryptography (a scheme under which different kinds of key information are used for encryption and decryption, such as a public key paired with a secret key).

If the device authentication server retains a secret key and if that key leaks out, a plurality of CE devices having the public key corresponding to that secret key could become vulnerable to abuses. By contrast, if one common key leaks out, the damage is limited only to the CE device having that common key. The common key system thus spreads risks of leaks and thereby improves security levels.

Details of the Embodiment

FIG. 1 is a schematic view showing a typical configuration of the device authentication system embodying the present invention.

The device authentication system 1 is constituted by a CE device 3, a service server 7, and a device authentication server 5, all interconnected communicably by a network.

In the setup of FIG. 1, only one CE device 3 and one service server 7 are shown for simplification and illustration. Ordinarily, however, there exist a plurality of units of each of these devices.

The CE device 3 is a device that can utilize services offered by the service server 7. The CE device 3 may illustratively be a video deck, a TV set, a stereo set, a game console, or some other electrical appliance.

The CE device 3 incorporates a device authentication module for requesting the device authentication server 5 to perform device authentication. The module stores information necessary for device authentication, such as device IDs, pass phrases, and URLs (uniform resource locators) of device authentication servers.

The device ID (identification) is information assigned uniquely to each CE device 3. This is the information by which to identify the CE device 3 on the network.

The pass phrase is secret information shared by the device authentication server 5 and each CE device 3. This information is used by the device authentication server 5 and CE device 3 in authenticating each other. Generally, pass phrases denote secret information of relatively large quantities, and passwords represent secret information of relatively small quantities. The larger the amount of information, the greater the difficulty for a third party to decrypt the information and the higher the level of security.

The URLs of device authentication servers constitute information that identifies device authentication sites. The CE device 3 can access the device authentication server 5 through the corresponding device authentication site.

On receiving a device authentication request from the service server 7, the device authentication module of the CE device 3 requests the device authentication server 5 to carry out device authentication. The result of the authentication is transmitted from the device authentication module to the service server 7.

The service server 7 is a server that offers the CE device 3 such services as the transmission of content.

Upon receipt of a service offering request from the CE device 3, the service server 7 requests the CE device 3 to effect device authentication. The service server 7 receives the result of the eventual device authentication from the CE device 3.

The service server 7 retains the URL of the device authentication site for each device authentication server 5. Using the URL, the service server 7 accesses the device authentication server 5 to check the result of the device authentication received from the CE device 3.

The service server 7 then verifies that the result of the authentication indeed originated from the device authentication server 5. After the verification, the service server 7 starts offering its services.

On receiving a device authentication request from the CE device 3, the device authentication server 5 authenticates that CE device 3. The device authentication server 5 also verifies the result of device authentication upon request from the service server 7 for a check on that result of authentication.

The device authentication server 5 retains the pass phrase for each of the CE devices 3 (only one CE device 3 is shown in FIG. 1) in correspondence with the device ID of the CE device 3 in question (using correspondence storing means). By acquiring the device ID from any CE device 3, the device authentication server 5 can identify the pass phrase of that CE device 3.

The device authentication server 5 thus shares the pass phrase with each CE device 3. Whether any CE device 3 requesting device authentication is valid is determined by checking that the CE device 3 in question is in possession of the correct pass phrase.

With this embodiment, the CE device 3 also checks that the party to which the device authentication request has been made is in possession of the correct pass phrase. The check is carried out to determine that the other party is the valid device authentication server 5.

The above procedure carried out by each of the parties involved to verify the other party is called mutual authentication.

The device authentication server 5 further retains connection destination URLs that permit access to the service sites of service servers 7 (only one service server 7 is shown in FIG. 1).

The device authentication server 5 prompts the CE device 3 to transmit the URL of the service site (i.e., connection destination URL) from which the CE device 3 in question is attempting to receive service offerings. The device authentication server 5 then checks to determine whether the received connection destination URL is found in its storage.

In the device authentication system 1, as outlined above, the URLs of the service sites for the configured service servers 7 are registered with the device authentication server 5. The arrangements make it possible to determine whether the service server 7 from which the CE device 3 is attempting to receive services has been duly registered. This prevents any result of device authentication from getting passed on to an illicit service server 7.

The device authentication server 5 also stores a server key Ks unique to each device authentication server.

As will be discussed later in more detail, upon receipt of a request for verification of the result of device authentication from the service server 7, the device authentication server 5 uses the server key Ks to ascertain that the verification result sent from the service server 7 was indeed issued by the device authentication server 5.

That is, the device authentication server 5 stores the result of device authentication in encrypted form using the server key Ks. When the verification result received from the service server 7 is found correctly decrypted by use of the server key Ks, the device authentication server 5 recognizes that the result was indeed issued by this server 5.

Figure 2:
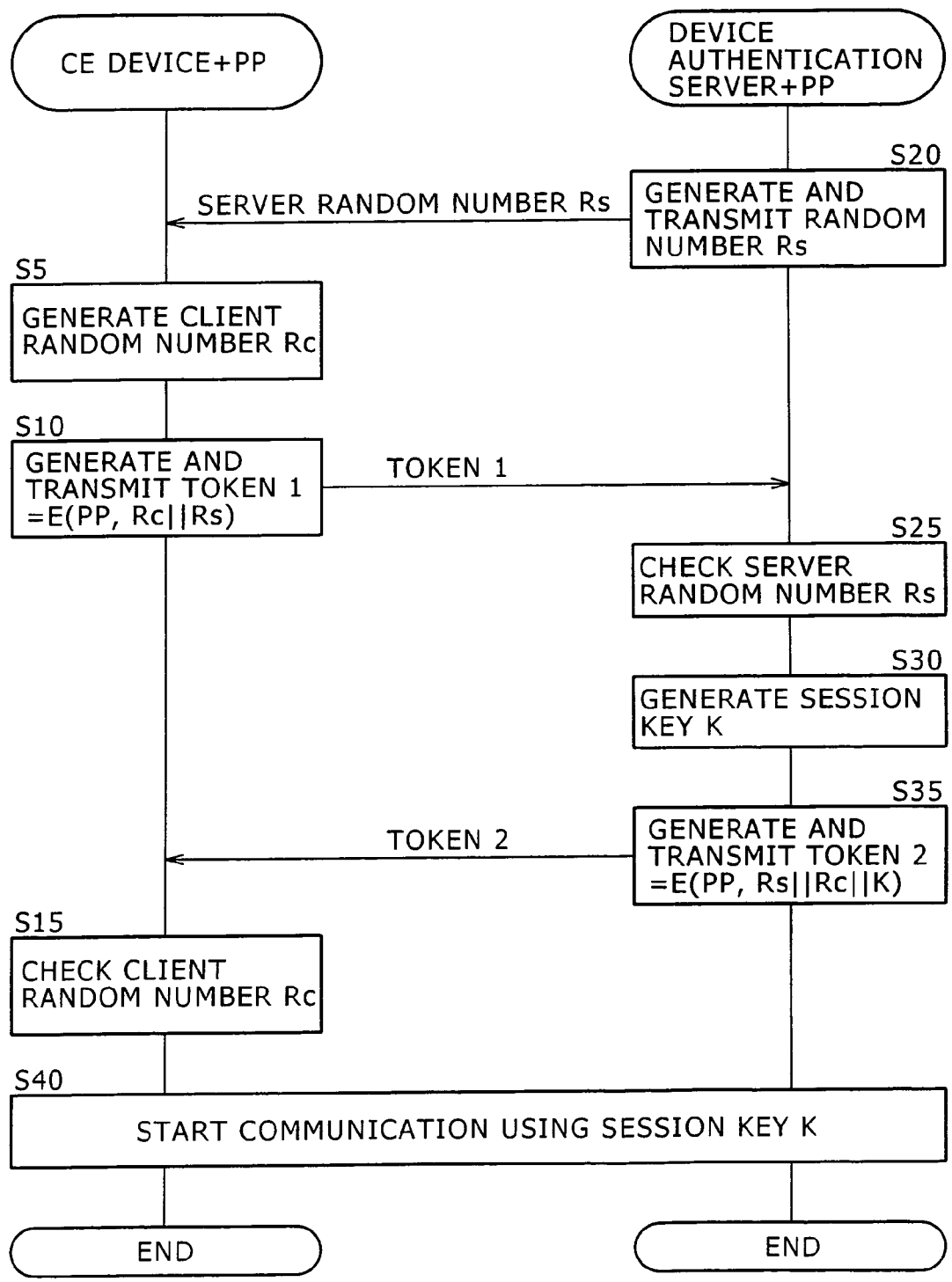
FIG. 2 is a flowchart of steps conceptually depicting a procedure performed by a CE device and a device authentication server for mutual authentication.

Described below with reference to FIG. 2 is an overall concept of typical steps performed by the CE device 3 and device authentication server 5 for mutually authenticating each other while sharing a common key therebetween.

The steps explained below conform to ISO 9798-2.

The device authentication server 5 first generates a server random number Rs and sends it to the CE device (in step 20). At this point, the device authentication server 5 retains the server random number Rs that has been transmitted.

The CE device 3 receives the server random number Rs from the device authentication server 5. At the same time, the CE device 3 generates a client random number Rc (in step 5).

The CE device 3 then generates a token 1 by encrypting the client random number Rc and server random number Rs using a pass phrase PP. The token 1 is defined by the following expression:

$$\text{token } 1 = E(PP, Rc \| Rs) \quad (1)$$

With this embodiment, in principle, information a encrypted using key information K based on an encryption system E is expressed as $E(K,A)$.

Thus the expression (1) above signifies that the token 1 is defined as information "Rc∥Rs" being encrypted by use of key information PP (i.e., pass phrase).

The notation "Rc∥Rs" refers to the information that is generated from Rc and Rs, illustratively by combining the two numbers in that order. In this case, if Rc is given as "123" and Rs as "456," then Rc"Rs is formed as "123456."

The CE device 3 retains the generated client random number Rc. At the same time, the CE device 3 transmits the token 1 to the device authentication server 5 (in step 10).

The device authentication server 5 receives the token 1 from the CE device 3, and decrypts the received token 1 using the pass phrase so as to acquire "Rc|Rs."

The device authentication server 5 already knows the number of digits constituting RC and the fact that the acquired information is formed by combining Rc with Rs, in that order. Based on that knowledge, the device authentication server 5 extracts Rs from the obtained information. The extracted Rs is compared with the previously stored Rs in order to check that the two numbers coincide with each other (in step 25).

If the number Rs is correctly acquired by decrypting the token 1 using the pass phrase, that means the CE device 3 encrypted the number Rs using the same pass phrase. This makes it possible to verify that the CE device 3 is in possession of this pass phrase.

In the manner described above, the device authentication server 5 can certify that the CE device 3 in question is a legitimate CE device.

The device authentication server 5 then generates a session key K (in step 30). The session key K is the information to be shared with the CE device 3 as secret information. The session key K is used as a common key.

After the CE device 3 and device authentication server 5 have checked each other's pass phrase PP, both parties use the session key K replacing the pass phrase PP as the common key. This arrangement is intended to minimize the usage of the pass phrase PP.

The device authentication server 5 generates a token 2 using the session key K as well as the random numbers Rs and Rc acquired earlier by decrypting the token 1. The token 2 thus generated is transmitted to the CE device 3 (in step 35). The token 2 is defined by the expression (2) below:

$$\text{token } 2 = E(PP, Rs \| Rc \| K) \quad (2)$$

where, the sequence of Rc followed by Rs in the expression (1) above is inverted here into a sequence of Rs followed by Rc so as to make it more difficult for an unscrupulous third party to decrypt the token 2.

The CE device 3 receives the token 2 and decrypts it using the pass phrase, thus acquiring "Rs∥Rc∥K."

The CE device 3 already knows that the acquired information is formed by combining Rs, Rc and K, in that order. These pieces of information are extracted from what has been decrypted of the token 2.

The CE device 3 then checks that the acquired Rc coincides with the previously stored Rc. The check is intended to ascertain that the device authentication server 5 is in possession of the pass phrase (in step 15).

In the manner described above, the CE device 3 verifies that the device authentication server 5 is a legitimate server.

By decrypting the token 2, the CE device 3 acquires the session key K that was generated by the device authentication server 5. This allows the CE device 3 to share the session key with the device authentication server 5.

After sharing the session key K, the CE device 3 and device authentication server 5 start communicating information encrypted using the session key K (in step S40).

The foregoing steps enable the CE device 3 and device authentication server 5 to authenticate each other and share the common key (i.e., session key K).

The above description showed the device authentication server 5 generating the session key K. However, this is not limitative of the invention. Alternatively, the CE device 3 may be arranged to generate the session key and send it to the device authentication server 5.

In that case, the CE device 3 generates the session key K and gets it included in the token 1 before sending the token 1 to the device authentication server 5.

Figure 3:
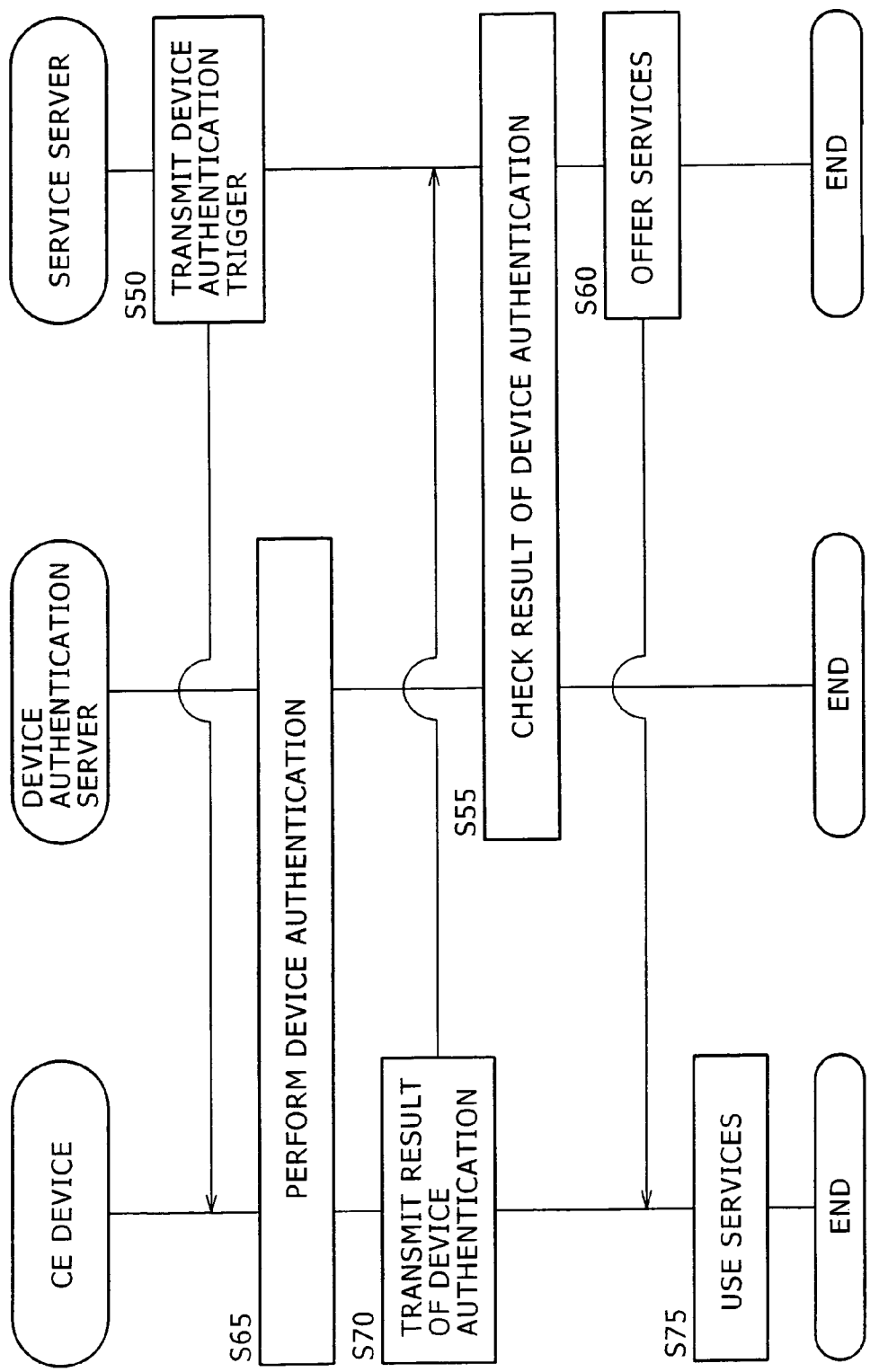
FIG. 3 is a flowchart of steps constituting a procedure ranging from the execution of device authentication to the offering of services.

Described below with reference to the flowchart of FIG. 3 is an information processing procedure to be carried out by the device authentication system 1 after the CE device 3 requests service offerings from the service server 7 and until the service server 7 starts offering its services.

The CE device 3 first gains access to the service server 7, and makes a service offering request to the accessed server.

In response, the service server 7 transmits a device authentication trigger to the CE device 3 (in step 50). The device authentication trigger refers to information by which to request the CE device 3 for device authentication.

With this embodiment, it is assumed that the CE device 3 retains the URL of a relevant device authentication site. Alternatively, the URL of a device authentication server 5 may be included in the device authentication trigger causing the CE device 3 to access the corresponding device authentication site. In this case, the service server 7 can designate a desired device authentication server to be accessed by the CE device 3 for device authentication.

On receiving the device authentication trigger from the service server 7, the CE device 3 accesses the device authentication server 5. The CE device 3 and device authentication server 5 then carry out a device authentication process therebetween (in step 65).

After the device authentication, the CE device 3 receives the result of the authentication from the device authentication server 5 and forwards the result to the service server 7 (in step 70).

The service server 7 receives the result of the device authentication from the CE device 3, and gains access to the device authentication server 5.

The service server 7 sends to the device authentication server 5 the result of the device authentication received from the CE device 3. The service server 7 and device authentication server 5 perform a device authentication result verification process therebetween (in step 55).

After verifying that the authentication result received from the CE device 3 was duly issued by the device authentication server 5, the service server 7 starts offering its services (in step 60).

The CE device 3 then makes use of the services offered by the service server 7 (in step 75).

The communications carried out between the CE device 3, device authentication server 5, and service server 7 in the steps described above are encrypted using a protocol such as SSL (Secure Sockets Layer). Thus it is very difficult for a third party to tap the communications.

As will be discussed later, a device authentication process according to the present invention is a highly secure process carried out without recourse to SSL.

What follows is a description of an encryption algorithm used by the CE device 3 and device authentication server 5 in communicating encrypted information.

This embodiment utilizes illustratively the encryption algorithm called AES128 (Advanced Standard 128-bit Key Version). It is assumed that the session key K is 256 bits long and that the key K is divided into a 128-bit key K1 for encryption purposes and a 128-bit key K2 for MAC use.

This algorithm involves dividing information (i.e., message) into 128-bit blocks and encrypting each of the blocks using a 128-bit common key for transmission and reception.

AES128 has two major modes: AES128-ECB, and AES128-CBC.

AES128-ECB is a mode in which to generate encrypted information by encrypting each message block using the common key.

With this embodiment, the information encrypted in AES128-ECB is defined by the expression (3) below:

$$ECB(K1, msg1\|msg2\| \ldots \|msgn) \qquad (3)$$

In the expression (3) above, the message is divided into 128-bit message blocks msg1, msg2, etc., each message block being encrypted using the 128-bit common key K1.

With AES128-CBC in effect, each message block is encrypted using the common key in conjunction with the encrypted result of the immediately preceding message block.

That is, whereas the same encrypted information is derived from the same message block in the above-described AES128-ECB mode, differently encrypted information is acquired from the same message block where AES128-CBC is in effect. The AES128-CBC mode thus makes illicit decryption more difficult than in AES128-ECB and thereby provides higher security levels.

With this embodiment of the invention, the information encrypted in AES128-CBC is defined by the expression (4) below:

$$CBC(K1, IV, msg1\|msg2\| \ldots \|msgn) \qquad (4)$$

In the expression (4) above, the message is divided into 128-bit message blocks msg1, msg2, etc., each message block being encrypted using the 128-bit common key K1. Upon encryption, the encrypted result of the immediately preceding message block is utilized so that a differently encrypted result will be gained from the same message block.

The starting message block msg1 has no preceding block and is thus given an initial value called IV (initial vector).

The IV is shared between the CE device 3 and the device authentication server 5.

AES128 also has a mode called AES128-CBC-MAC (simply called MAC hereunder).

This mode provides the last message block of the information encrypted in CBC as defined by the expression (4) above. The mode is defined by the expression (5) below:

$$AES128\text{-}CBC\text{-}MAC(K2, IV, msg1\|msg2\| \ldots \|msgn) \quad (5)$$

MAC constitutes information for verifying that the information encrypted in AES128-CBC has not been corrupted during communication. The verification based on MAC is carried out as follows:

MAC is first transmitted to the destination along with corresponding information encrypted in AES128-CBC.

The receiving party receives the information encrypted in AES128-CBC as well as the corresponding MAC, and decrypts the encrypted information through the use of key information K1 derived from the session key K and the initial value IV, thereby obtaining the message.

The acquired message is then encrypted in AES128-CBC using key information K2 derived from the session key K.

The party that received the encrypted information compares the last block of the information encrypted in AES128-CBC with the MAC received earlier. A match between the two values compared verifies that the information encrypted in AES128-CBC has not been corrupted during communication. A mismatch between the two indicates that the encrypted information has been altered during communication.

In place of MAC, a hash value regarding data that combines the message with the key information K2 may be transmitted instead.

In that case, the party that received the encrypted information calculates the hash value about the data formed by combining the result decrypted using K1 with the key information K2, and checks to determine whether the calculated hash value coincides with the hash value that had been transmitted together with the encrypted information. A mismatch between the two values reveals tampering in transmit.

Figure 4:
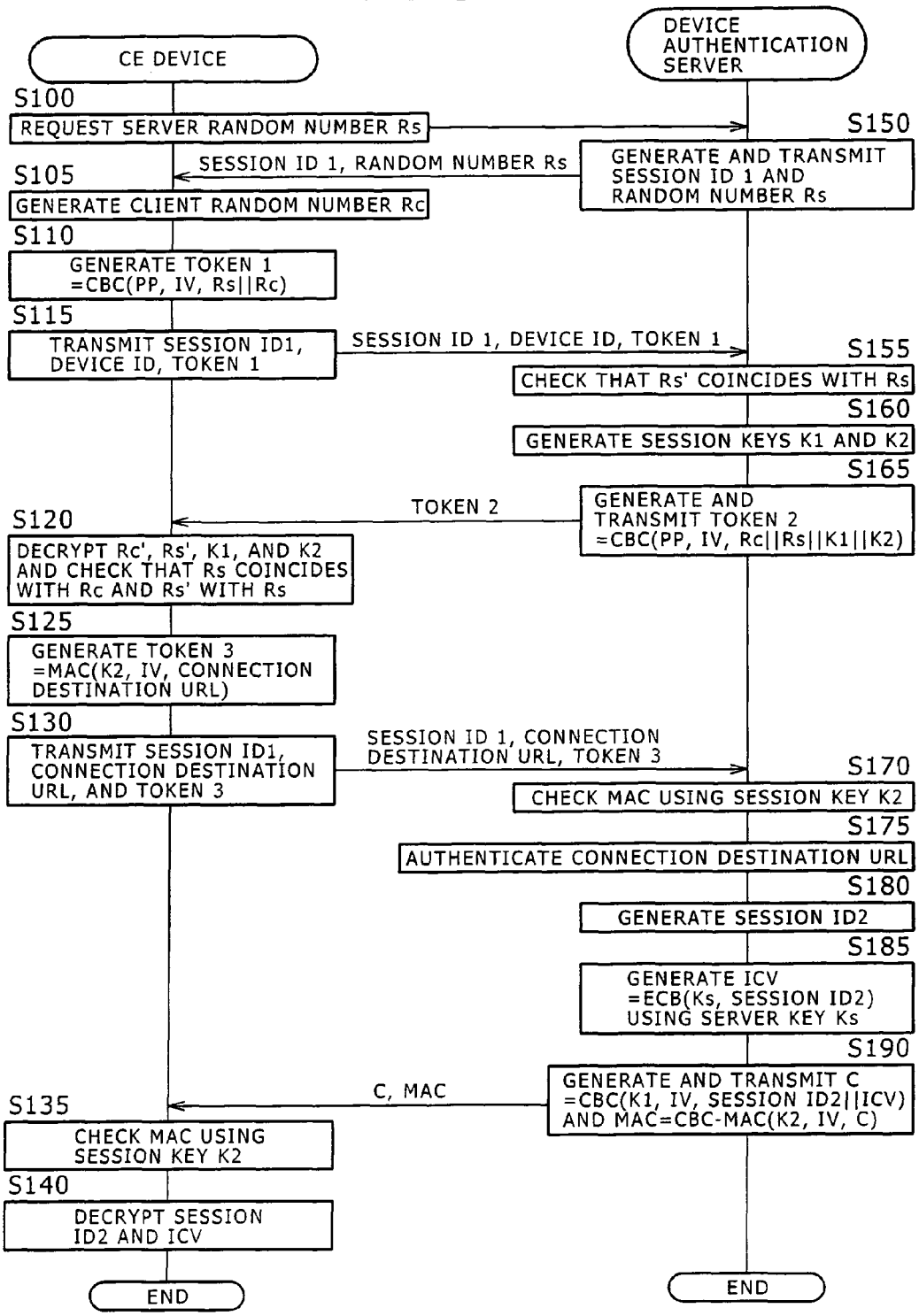
FIG. 4 is a flowchart of steps constituting a procedure performed by the device authentication server and CE device in carrying out a device authentication process.

Described below with reference to FIG. 4 are steps constituting the device authentication process (i.e., step 65 in FIG. 3) carried out by use of the encryption algorithm discussed above.

The CE device 3 first requests (by use of requesting means) the device authentication server 5 to transmit a server random number Rs (in step 100).

On receiving the request (by request accepting means), the device authentication server 5 generates a session ID1 and a 128-bit server random number Rs and sends them (using server-specific information transmitting means) to the CE device 3 (in step 150). The device authentication server 5 stores the server random number Rs and session ID1 in combination.

The server random number Rs constitutes server-specific information that is unique to the device authentication server 5.

The session ID1 is session identification information that is used for maintaining the session.

The device authentication server 5 is arranged to authenticate a plurality of CE devices 3. For that reason, the device authentication server 5 during a device authentication process needs to identify the session that the CE device 3 currently accessing the server 5 takes part in.

Upon initial access by the CE device 3 to the device authentication server 5, the latter issues a session ID1. Later, when the same CE device 3 again accesses the device authentication server 5, the CE device 3 presents the server 5 with the session ID1. This enables the device authentication server 5 to continue the authentication of the CE device 3 in question.

The CE device 3 receives and acquires the session ID1 and server random number Rs.

The CE device 3 generates and stores a 128-bit client random number Rc (in step 105), and generates a token 1 defined by the expression (6) below (in step 110). The client random number Rc constitutes terminal-specific information that is unique to the CE device 3. The expression defining the token 1 is as follows:

$$\text{token } 1 = CBC(PP, IV, Rs\|Rc) \quad (6)$$

In this case, the pass phrase PP is used as the common key for generating the token 1. The pass phrase PP and initial value IV are shared between the CE device 3 and the device authentication server 5.

The CE device 3 sends to the device authentication server 5 (by use of encrypted server-specific information transmitting means and terminal-specific information transmitting means) the session ID1 received earlier from the server 5, the generated token 1, and the device ID (in step 115).

The device authentication server 5 receives these pieces of information from the CE device 3 (through encrypted server-specific information receiving means, terminal-specific information receiving means, and device ID receiving means). Using the session ID1, the device authentication server 5 first identifies the session with which the received pieces of information are associated. The combination of the previously stored session ID1 with the corresponding server random number Rs allows the device authentication server 5 to identify the server random number Rs issued to the CE device 3.

Using the device ID received from the CE device 3, the device authentication server 5 then recognizes the CE device 3 and identifies the pass phrase PP shared with the CE device 3 (by use of secret information identifying means). The device authentication server 5 proceeds to decrypt the token 1 by utilizing the identified pass phrase PP and the initial value IV, thereby acquiring the server random number Rs and client random number Rc.

The device authentication server 5 has advance knowledge that the information "Rs∥Rc" obtained by decrypting the token 1 is the combination of the server random number Rs with the client random number Rc and that each of these random numbers is 128 bits long. The knowledge allows the device authentication server 5 to extract the server random number Rs and client random number Rc from the information "Rs∥Rc" obtained by decrypting the token 1.

In the description that follows, the server random number extracted from the decrypted token 1 is denoted by Rs' so that the extracted number can be distinguished from the server random number generated earlier by the device authentication server 5.

In the same context, the client random number obtained by the CE device 3 decrypting the information sent from the device authentication server 5 is represented by Rc'. The random number Rc' is thus distinguished from the client random number Rc generated by the CE device 3.

The device authentication server 5 then checks to determine whether the acquired server random number Rs' matches the server random number Rs generated earlier (in step 155).

A match between the two numbers enables the device authentication server 5 to ascertain that the CE device 3 is in possession of the pass phrase PP (by use of device authenticating means). In this case, the device authentication server 5 continues its device authentication process.

A mismatch between the two random numbers prompts the device authentication server 5 to determine that the CE device 3 is not in possession of the pass phrase PP. In this case, the device authentication server 5 finds the device authentication process unsuccessful and aborts it accordingly.

When the server random number Rs' and the server random number Rs are found to coincide with each other, the device authentication server 5 generates a 128-bit session key K1 and a second session key K2 (in step 160). For that purpose, the device authentication server 5 has session key acquiring means and second session key acquiring means.

The session keys K1 and K2 thus generated are later used as common keys.

Although it is possible to continue utilizing the pass phrase PP in subsequent steps, this embodiment is arranged to have the session keys K1 and K2 shared between the CE device and the device authentication server. This arrangement is intended to minimize the use of the pass phrase PP for security reasons.

Whereas it is possible to use a single common key in the ensuing steps, this embodiment is arranged to have a plurality of common keys employed for different purposes: the session key K1 is used as the common key for encrypting information about device authentication, and the session key K2 is utilized as the common key for encrypting messages to be attached to the device authentication information. This arrangement is designed to further enhance the level of security.

After generating the session keys K1 and K2, the device authentication server 5 generates a token 2 defined by the expression (7) below. The generated token 2 is transmitted (by use of terminal-specific information transmitting means) to the CE device 3 (in step 165). The expression defining the token 2 is as follows:

$$\text{token } 2 = CBC(PP, IV, Rc\|Rs\|K1\|K2) \quad (7)$$

The CE device 3 receives the token 2 from the device authentication server 5, and encrypts the received token 2 using the pass phrase PP and initial value IV so as to acquire information "Rc∥Rs∥K1∥K2."

The CE device 3 has advance knowledge that the acquired information is formed by connecting the 128-bit information Rc', Rs', K1 and K2, in that order. The knowledge enables the CE device 3 to obtain the client random number Rc', server random number Rs', and session keys K1 and K2 from the decrypted token 2 (using session key acquiring means and second session key acquiring means).

The CE device 3 then checks to determine whether the acquired client random number Rc' matches the client random number Rc generated earlier (in step 120).

A match between the two random numbers allows the CE device 3 to ascertain that the device authentication server 5 is in possession of the pass phrase PP (by use of server authenticating means). In this case, the CE device 3 continues its device authentication process.

A mismatch between the two random numbers prompts the CE device 3 to determine that the device authentication server 5 is not in possession of the pass phrase PP. In this case, the CE device 3 finds the device authentication process unsuccessful and aborts it accordingly.

This embodiment is arranged to verify coincidence between the server random number Rs' and the server random number Rs transmitted in step 150 from the device authentication server 5. This arrangement is intended to further boost the level of security.

When the client random number Rc' and the client random number Rc are found to match, the CE device 3 generates a token 3 defined by the expression (8) below (in step 125):

$$\text{token } 3 = MAC(K2, IV, \text{connection destination } URL) \quad (8)$$

where, the connection destination URL denotes the URL of the service site for the service server 7.

The CE device 3 then transmits the session ID1, connection destination URL, and token 3 to the device authentication server 5 (in step 130).

The device authentication server 5 acquires these pieces of information from the CE device 3, and checks MAC based on the session key K2 to see if the connection destination URL has been altered during communication (in step 170).

More specifically, the device authentication server 5 encrypts the connection destination URL received from the CE device 3 using the session key K2 in the AES128-CBC mode. The device authentication server 5 then checks to determine whether the last block of the encrypted information matches MAC. A match verifies that the connection destination URL has not been corrupted.

The device authentication server 5 proceeds to determine whether the connection destination URL is one of the URLs registered with the server 5 beforehand. If the URL is found registered earlier with the device authentication server 5, it proves that the connection destination URL is valid (in step 175).

If the connection destination URL is found altered or invalid, then the device authentication server 5 finds the device authentication process unsuccessful and aborts it accordingly.

If the connection destination URL is found uncorrupted and valid, then the device authentication server 5 generates a session ID2 (in step 180).

The device authentication server 5 proceeds to generate an ICV (integrity check value) using the server key Ks unique to the device authentication server 5 (in step 185). The ICV is defined by the expression (9) below:

$$ICV = ECB(Ks, \text{session } ID2) \quad (9)$$

The session ID2 and ICV are later used by the CE device 3 as certificate information proving to the service server 7 that the device 3 has been authenticated by the device authentication server 5.

As will be discussed later in detail, the device authentication server 5 receives from the service server 7 the session ID2 and ICV so as to verify the result of device authentication. That is, after receiving the session ID2, the device authentication server 7 checks that the received session ID2 matches its counterpart from the decrypted ICV.

The session ID2 makes up identification information for identifying the result of the authentication of the CE device 3, and ICV constitutes encrypted identification information which is information for identification purposes encrypted by use of the server key Ks. As implied in connection with steps 180 and 185, the device authentication server 5 has certificate information generating means.

Based on the generated session ID2 and ICV, the device authentication server 5 generates (using detection information generating means) encrypted information C defined by the expression (10) below as well as MAC, and transmits what is generated to the CE device 3 (in step 190). MAC constitutes detection information for verifying that certificate information has not been altered during communication.

The scheme under which the encrypted information C is generated together with corresponding MAC is sometimes referred to as the Encrypt-then-MAC scheme. The expression defining the encrypted information C is as follows:

$$C = CBC(K1, IV, \text{session } ID2\|ICV) \quad (10)$$

The expression defining MAC is as follows:

$$MAC=CBC\text{-}MAC(K2,IV,C) \quad (11)$$

The CE device 3 receives these pieces of information from the device authentication server 5 (using certificate information receiving means and detection information receiving means). Based on the session key K2 and initial value IV, the CE device 3 first encrypts the encrypted information C in AES128-CBC (using detection information generating means).

The CE device 3 checks to see if the last block of the encrypted information matches the MAC received from the device authentication server 5 (using checking means) for MAC verification (in step 135).

A match between the last block and MAC allows the CE device 3 to ascertain that the encrypted information C has not been altered during communication.

A mismatch between the last block of the encrypted information and MAC enables the CE device 3 to determine that the encrypted information C has been corrupted during communication. In this case, the CE device 3 finds the device authentication process unsuccessful and aborts it accordingly.

After checking that the encrypted information C is not altered based on MAC, the CE device 3 decrypts the information C by use of the session key K1 and initial value IV so as to acquire information "session ID2∥ICV."

The CE device 3 has advance knowledge that the obtained information is formed by connecting the session ID2 and ICV, in that order. The knowledge enables the CE device 3 to acquire the session ID2 and ICV from the encrypted information C that has been decrypted (in step 140).

With the device authentication process successfully completed, the CE device 3 acquires the session ID2 and ICV from the device authentication server 5 as the result of the authentication.

The CE device 3 then transmits these pieces of information to the service server 7 as certificate information proving that the CE device in question has been authenticated (through certificate information transmitting means).

Figure 5:
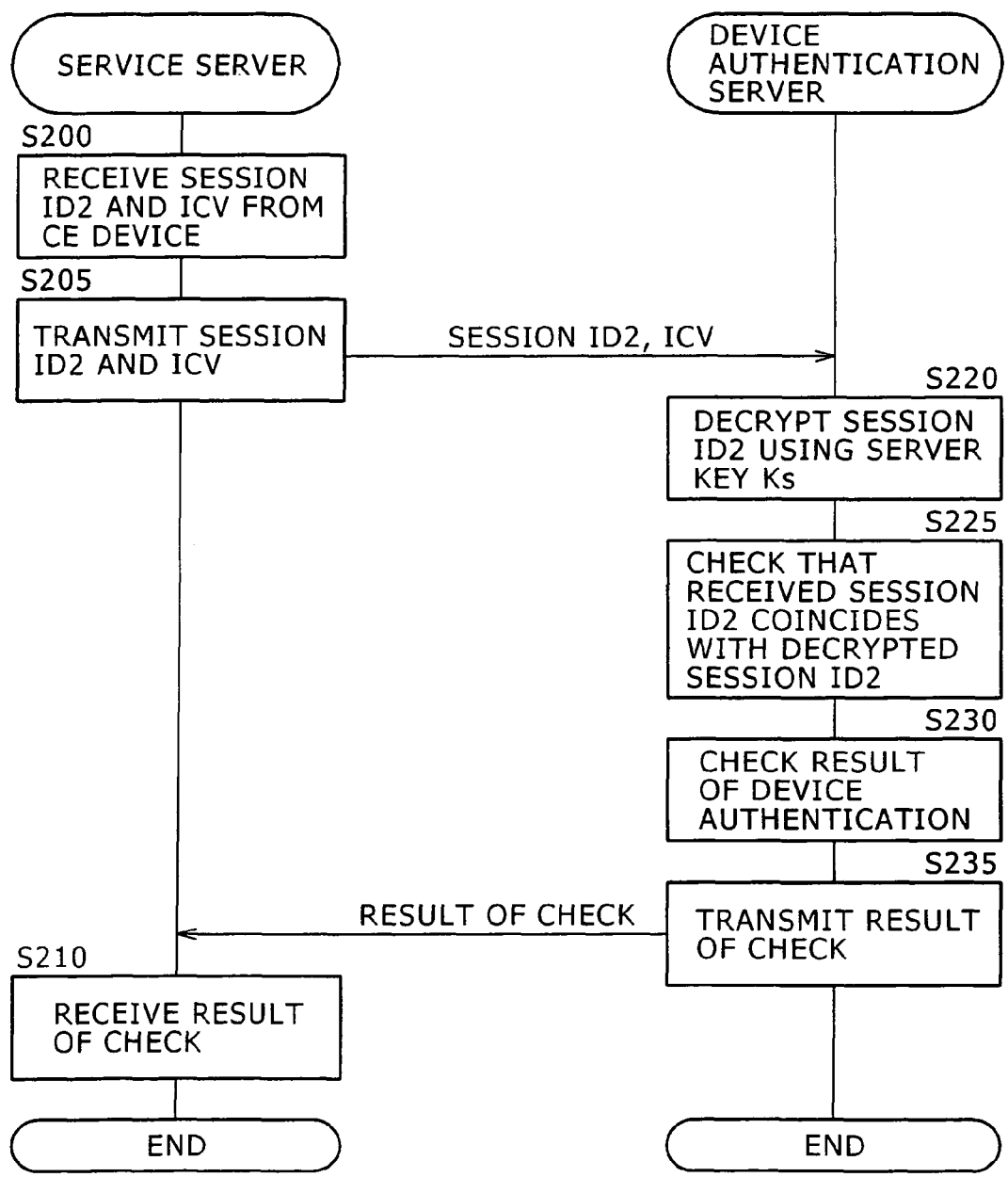
FIG. 5 is a flowchart of steps constituting a procedure performed by a service server in checking the result of device authentication by the device authentication server.

Described below with reference to FIG. 5 are the steps constituting a device authentication result checking process (i.e., step 55 in FIG. 3) in which the service server 7, upon receipt of the session ID2 and ICV from the CE device 3, requests the device authentication server 5 to ascertain the result of the device authentication based on the received pieces of information.

The service server 7 first receives the session ID2 and ICV from the CE device 3 (in step 200).

The service server 7 then transmits the received session ID2 and ICV to the device authentication server 5 (in step 205).

The device authentication server 5 receives these pieces of information from the service server 7 (through certificate information receiving means), and decrypts the ICV using the server key Ks (through encrypted identification information decrypting means) so as to acquire the session ID2 (in step 220).

If the session ID2 derived from the ICV decrypted by use of the server key Ks is found to match the session ID2 in its possession, the device authentication server 5 can verify that the received session ID2 has indeed been issued by itself.

The device authentication server 5 then checks to determine (using determining means) whether what is obtained from the decrypted ICV matches the session ID2 received from the service server 7 (in step 225).

If the above comparison results in a match, then the device authentication server 5 continues its device authentication result checking process. In case of a mismatch, the device authentication server 5 finds the device authentication result checking process unsuccessful and aborts it accordingly.

Although the integrity of the session ID2 was shown checked through encryption in the foregoing description, this is not limitative of the invention. Alternatively, the check may be carried out using MAC.

The ICV is transmitted to the device authentication server 5 together with the session ID2 for combined use. That is because simply decrypting the session ID2 from the ICV would fail to specify which of the previously issued sessions ID2s is to match this particular session ID2.

The session ID2 is thus sent to the device authentication server 5 in combination with the ICV. After the ICV is decrypted, the session ID2 is utilized for comparison with what has been decrypted.

Using the session ID2, the device authentication server 5 identifies the session in which the device authentication process was carried out (using device authentication result identifying means). The purpose of this action is to check the result of the device authentication in the identified session, i.e., to ascertain that the CE device 3 has indeed been authenticated by the device authentication server 5 (in step 230).

The device authentication server 5 transmits the result of the check to the service server 7 (in step 235). The service server 7 receives the check result thus transmitted (in step 210).

As described above, after receiving the result of the device authentication from the CE device 3, the service server 7 inquires the device authentication server 5 whether the received result of the authentication is valid. This action is taken to make sure that even if the CE device 3 is apparently authenticated by an unscrupulous party disguising itself as the device authentication server 5 or if an illicit device disguising itself as the CE device 3 pretends to have been authenticated by the device authentication server 5, the device authentication server 5 can still determine the validity of the result of the device authentication.

If the ICV is combined with a timestamp, it is also possible to verify the lifetime of the session ID2.

More specifically, the session ID2 is assigned an expiration date. When the service server 7 inquires the device authentication server 5 whether the result of the device authentication is valid, the device authentication server 5 can determine whether the result of the authentication comes before the expiration date.

What follows is a description of how the CE device 3 is structured in terms of hardware.

Figure 6:
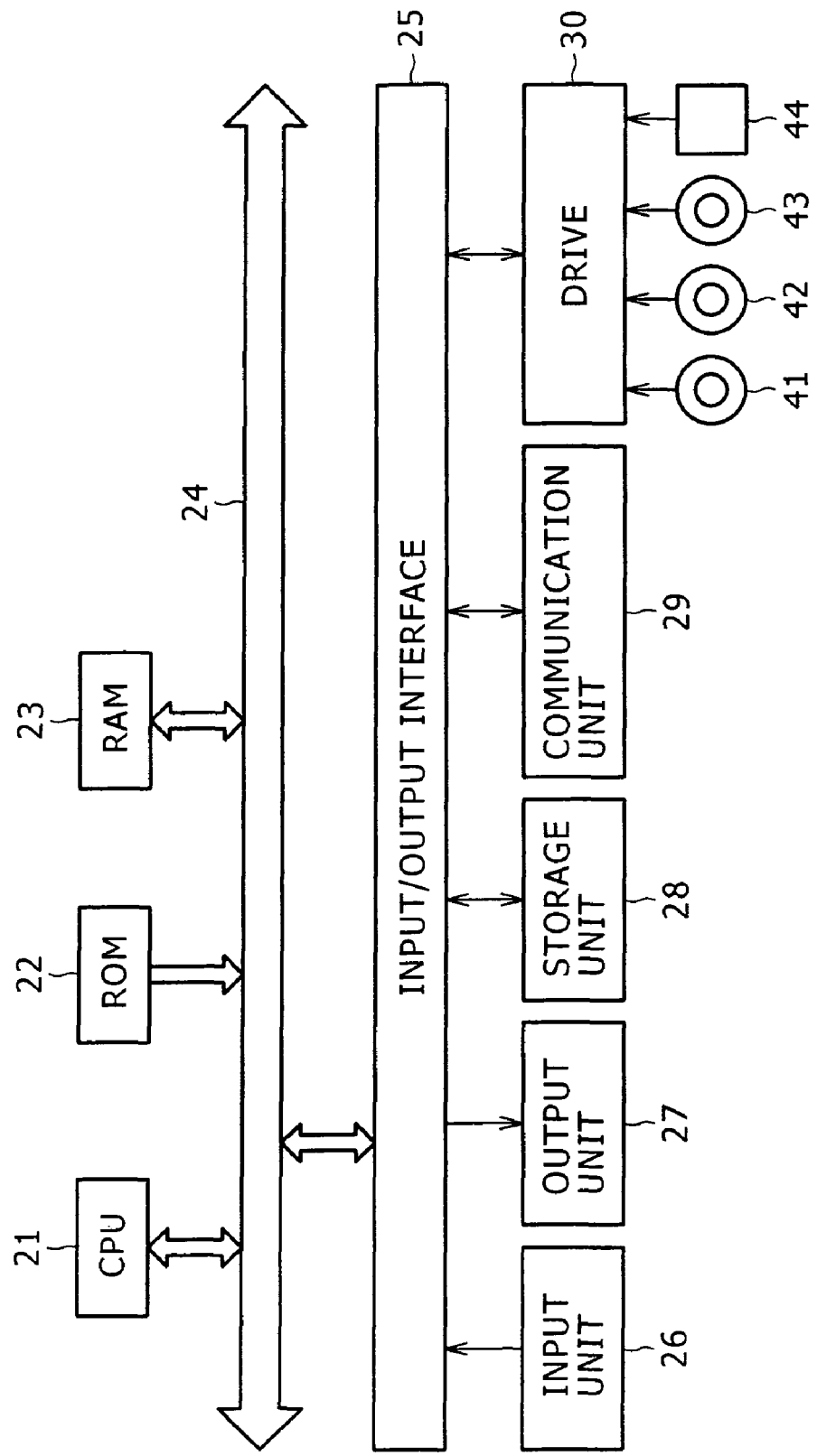
FIG. 6 is a schematic view showing a typical hardware structure of the CE device.

FIG. 6 is a schematic view showing a typical hardware structure of the CE device 3.

A CPU (central processing unit) 21 performs diverse processes in accordance with the programs stored in a ROM (read only memory) 22 or loaded from a storage unit 28 into a RAM (random access memory) 23.

Illustratively, as described above with reference to FIGS. 4 and 5, the CPU 21 carries out information processing about device authentication by communicating with the device authentication server 5 and service server 7. The CPU 21 also executes information processing necessary for offering the user such services as reproduction of content.

The CPU 21, ROM 22, and RAM 23 are interconnected by a bus 24.

An input/output interface 25 is also connected to the bus 24. By way of the input/output interface 25, an input unit 26, an output unit 27, the storage unit 28, a communication unit 29, and a drive 30 are connected to the CPU 21.

Diverse input and output units are attached to the CE device 3 depending on its product type (e.g., TV set, video deck, stereo set, etc.). Illustratively, the input unit 26 may be a character data input device such as a keyboard and/or a pointing device such as a mouse. The output unit 27 may be a picture display device such as an LCD (liquid crystal display) or a plasma display furnished with an audio output device such as speakers.

The storage unit 28 is composed of a storage device such as a hard disk drive. This unit accommodates varieties of programs including a device authentication program used by the CPU 21 for performing device authentication, a content reproduction program for reproducing content, an OS (operating system) that provides basic controls over the CE device 3, as well as diverse data such as the device ID, pass phrase and others required for device authentication.

The communication unit 29 is constituted by a communication control device such as a modem or a terminal adapter that is connected to the network.

It is through the communication unit 29 that the CPU 21 communicates with the device authentication server 5, service server 7, and other servers.

The drive 30 is loaded as needed with a storage medium such as a magnetic disk 41, an optical disk 42, a magneto-optical disk 43, or a memory card 44.

Using the drive 30, the CPU 21 operates the loaded storage medium so as to write and read programs and data to and from that medium.

The device authentication server 5 and service server 7 have basically the same hardware structure as that of the CE device 3.

The device authentication server 5 has a storage medium that contains programs and data necessary for running a device authentication site and an authentication checking site; a CPU that carries out these programs; and a communication unit for communicating with the CE device 3 and service server 7. The service server 7 has a storage medium that stores programs and data necessary for requesting device authentication from the CE device 3 and for requesting the device authentication server 5 to verify the result of device authentication, and a CPU that executes these programs.

What follows is an explanation of the amount of calculations carried out under two typical device authentication schemes: common key system (symmetric key scheme), and public key system (asymmetric key scheme).

An encryption system known as the RSA (Rivest-Samir-Adleman) Cryptosystem is representative of the public key system.

Comparing the RSA Cryptosystem with the AES encryption system discussed in the foregoing description reveals this: that for encryption, the amount of calculations required to be carried out by the RSA Cryptosystem is about 100 times that by the AES encryption system; and that for decryption, the amount of calculations to be performed by the RSA is about 2,500 times that by the AES.

Other varieties of the public key system involve executing approximately the same amount of calculations as the RSA Cryptosystem. It follows that in carrying out device authentication using the common key system, the device authentication server 5 and CE device 3 are required to perform far fewer computations than if the public key system is adopted.

In particular, the device authentication server 5 is typically subject to the concentrated arrival of device authentication requests from a plurality CE devices 3. For that reason, reducing the amount of calculations required for device authentication is an important objective to be achieved.

The above-described embodiment of the present invention thus provides the following major effects:

(1) The CE device 3 and device authentication server 5 can authenticate each other using the pass phrase PP as a common key.

(2) During mutual authentication, session keys K1 and K2 can be shared between the two devices. After the mutual authentication, the two sides may communicate with each other using the session keys K1 and k2 as common keys. This makes it possible to minimize the use of the pass phrase PP and thereby improve the level of security.

(3) Two session keys K1 and K2 are used, K1 for transmitting and receiving information associated with device authentication, and K2 for sending and receiving messages. The dual session key scheme further boosts the level of security.

(4) Without recourse to the public key system, the embodiment allows the session ID2 to be issued as the result of device authentication based on the common key system. This drastically reduces the quantity of calculations required for the authentication.

(5) The device authentication server 5 issues the session ID2 using the Encrypt-then-MAC scheme. This makes it possible for the embodiment to detect falsifications that may have been carried out during communication, thus enhancing the level of security.

(6) Introduction of the server key Ks permits authentication of the validity of the session ID2.

(First Variation)

The above-described embodiment was shown requiring five passes (i.e., steps 150, 115, 165, 130 and 190 in FIG. 4) for device authentication. Alternatively, in one variation of the present invention, the number of passes for device authentication may be reduced to three by getting encrypted communication started before the encryption process is successfully concluded.

With the number of passes reduced, the device authentication process can be made simpler and its efficiency higher than before.

Figure 7:
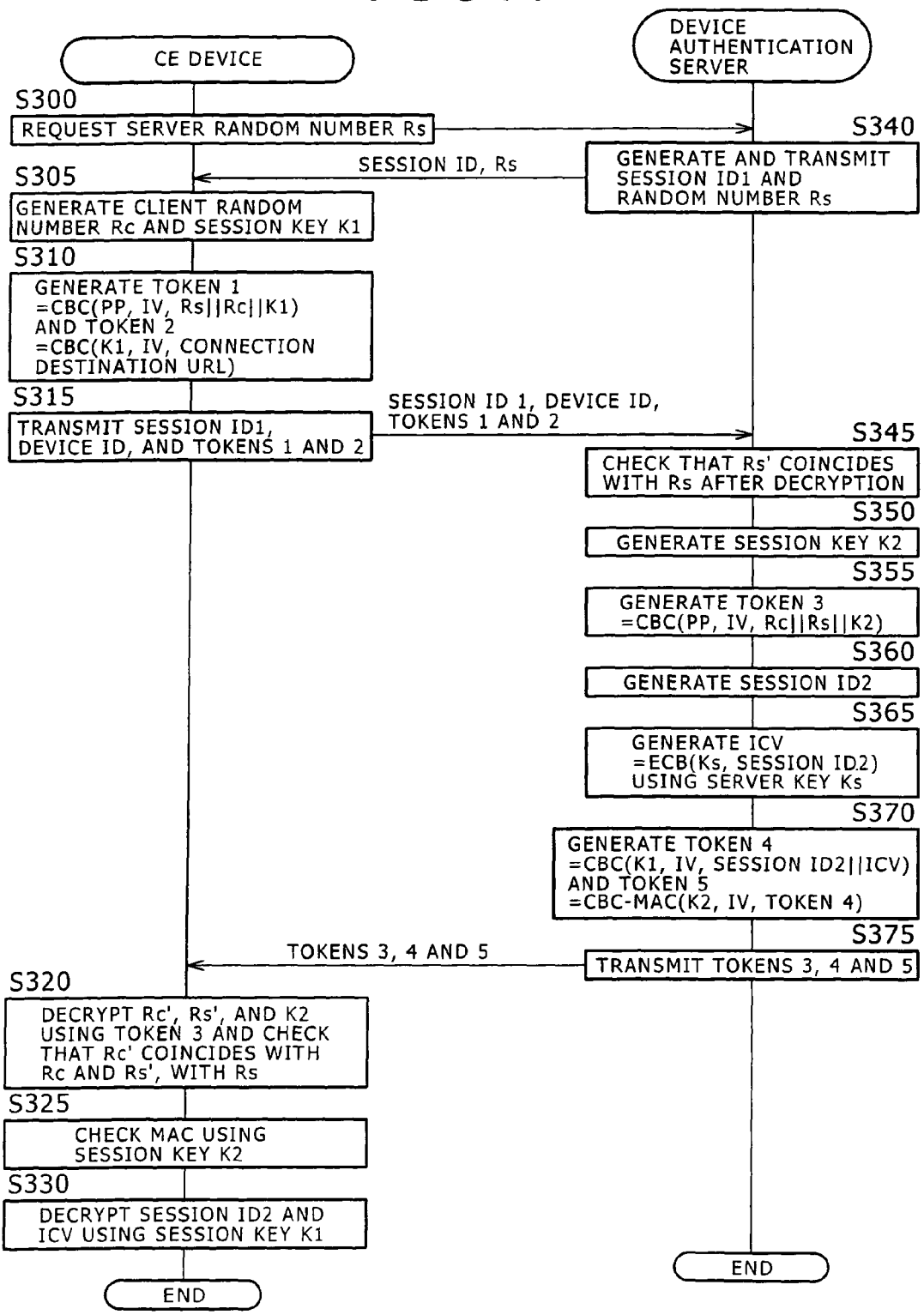
FIG. 7 is a flowchart of steps constituting one variation of the present invention for carrying out device authentication.

The structure of the device authentication system for this variation is the same as that of the device authentication system 1 discussed above. Described below with reference to FIG. 7 are the steps of this variation in which the device authentication server 5 authenticates the CE device 3.

The CE device 3 first requests the device authentication server 5 to transmit a server random number Rs (in step 300).

In response, the device authentication server 5 generates a session ID 1 and the server random number Rs, 128 bits long each, and sends them to the CE device 3 (in step 340).

The CE device 3 receives and stores these pieces of information. In turn, the CE device 3 generates a client random number Rc and a session key K1, 128 bits long each (in step 305).

With this variation of the invention, as described, the CE device 3 generates the session key K1 before the device authentication server 5 authenticates the CE device 3. The two devices start communicating with each other using the session key K1 as the common key.

The CE device 3 then generates tokens 1 and 2 defined by the following expressions (in step 310):

$$\text{token } 1 = CBC(PP, IV, Rs \| Rc \| K1) \quad (12)$$

$$\text{token } 2 = CBC(K1, IV, \text{connection destination } URL) \quad (13)$$

The CE device 3 then transmits a session ID1, a device ID, and the tokens 1 and 2 to the device authentication server 5 (in step 315).

That is, using the token 1, the CE device 3 can offer the device authentication server 5 both the information for authenticating the CE device 3 (i.e., server random number Rs) and the session key K1 for use as the common key at the same time.

The device authentication server 5 receives these pieces of information from the CE device 3, and places them into its storage unit.

Based on the device ID, the device authentication server 5 identifies the pass phrase PP being held by the CE device 3. Using the pass phrase PP, the device authentication server 5 decrypts the token 1 and thereby acquires information "Rs∥Rc∥K1."

From the information "Rs∥Rc∥K1," the device authentication server 5 extracts the server random number Rs', client random number Rc', and session key K1.

The device authentication server 5 proceeds to determine whether the previously generated server random number Rs matches the server random number Rs' obtained by decrypting the token 1 (in step 345).

If the two random numbers are found to match, the CE device 3 is considered to have the pass phrase PP and thus the device authentication process is concluded successfully. In case of a mismatch between the two random numbers, the device authentication process is regarded as unsuccessful and is aborted accordingly.

The connection destination URL is acquired by decrypting the token 2 through the use of the session key K1 obtained from the decrypted token 1 and of the initial value IV shared beforehand with the CE device 3. A check is then made to determine whether any one of the URLs registered in advance with the device authentication server 5 matches the acquired URL.

The device authentication server 5 then generates a 128-bit session key K2 (in step 350), and generates a token 3 defined by the following expression (in step 355):

$$\text{token }3=CBC(PP,IV,Rc\|Rs\|K2) \quad (14)$$

The device authentication server 5 proceeds to generate a session ID2 (in step 360).

Using the server key Ks, the device authentication server 5 generates the ICV defined by the expression (15) below (in step 365), generates tokens 4 and 5 defined respectively by the expressions (16) and (17) below (in step 370), and transmits the tokens 3, 4 and 5 to the CE device 3 (in step 375). The expressions are as follows:

$$ICV=ECB(Ks,\text{session }ID2) \quad (15)$$

$$\text{token }4=CBC(K1,IV,\text{session }ID2\|ICV) \quad (16)$$

$$\text{token }5=CBC\text{-}MAC(K2,IV,\text{token }4) \quad (17)$$

The CE device 3 receives and stores these tokens. Using the pass phrase PP, the CE device 3 first decrypts the token 3. Using the decrypted token 3, the CE device 3 acquires the client random number Rc', server random number Rs', and session key K2.

The CE device 3 proceeds to determine whether the previously generated client random number Rc matches the client random number Rc' obtained by decrypting the token 3 (in step 320).

If the two random numbers are found to match, the device authentication server 5 is considered to have the pass phrase PP in possession. In case of a mismatch between the two random numbers, the authentication process is deemed unsuccessful and aborted accordingly.

The CE device 3 also checks to determine whether the server random number Rs received from the device authentication server 5 matches the server random number Rs' acquired from the decrypted token 3.

The CE device 3 proceeds to encrypt the token 4 received from the device authentication server 5 in AES128-CBC using the session key K2 acquired by decrypting the initial value IV and token 3. The last block of the encrypted token is compared with MAC (token 5) for MAC verification (in step 325).

If the last block is found to match MAC, the token 4 is deemed valid. A mismatch between them reveals that the token 4 has been altered.

After checking the validity of the token 4, the CE device 3 decrypts the token 4 by use of the initial value IV and session key K1. From the decrypted token 4, the CE device 3 obtains the session ID2 and ICV (in step 330).

Following acquisition of the session ID2 and ICV, the CE device 3 performs the same information processing steps as those carried out by the above-described embodiment of the invention.

This variation of the present invention, as described above, starts encrypted communication by use of the session keys K1 and K2 before the mutual authentication between the CE device and the device authentication server is completed. This variation thus permits device authentication in just three steps (steps 340, 315 and 375).

(Second Variation)

A second variation of the present invention is arranged to have the CE device 3 and service sever 7 share a session key therebetween. Using the shared session key, the CE device 3 and service server 7 communicate with each other in encrypted fashion.

Figure 8:
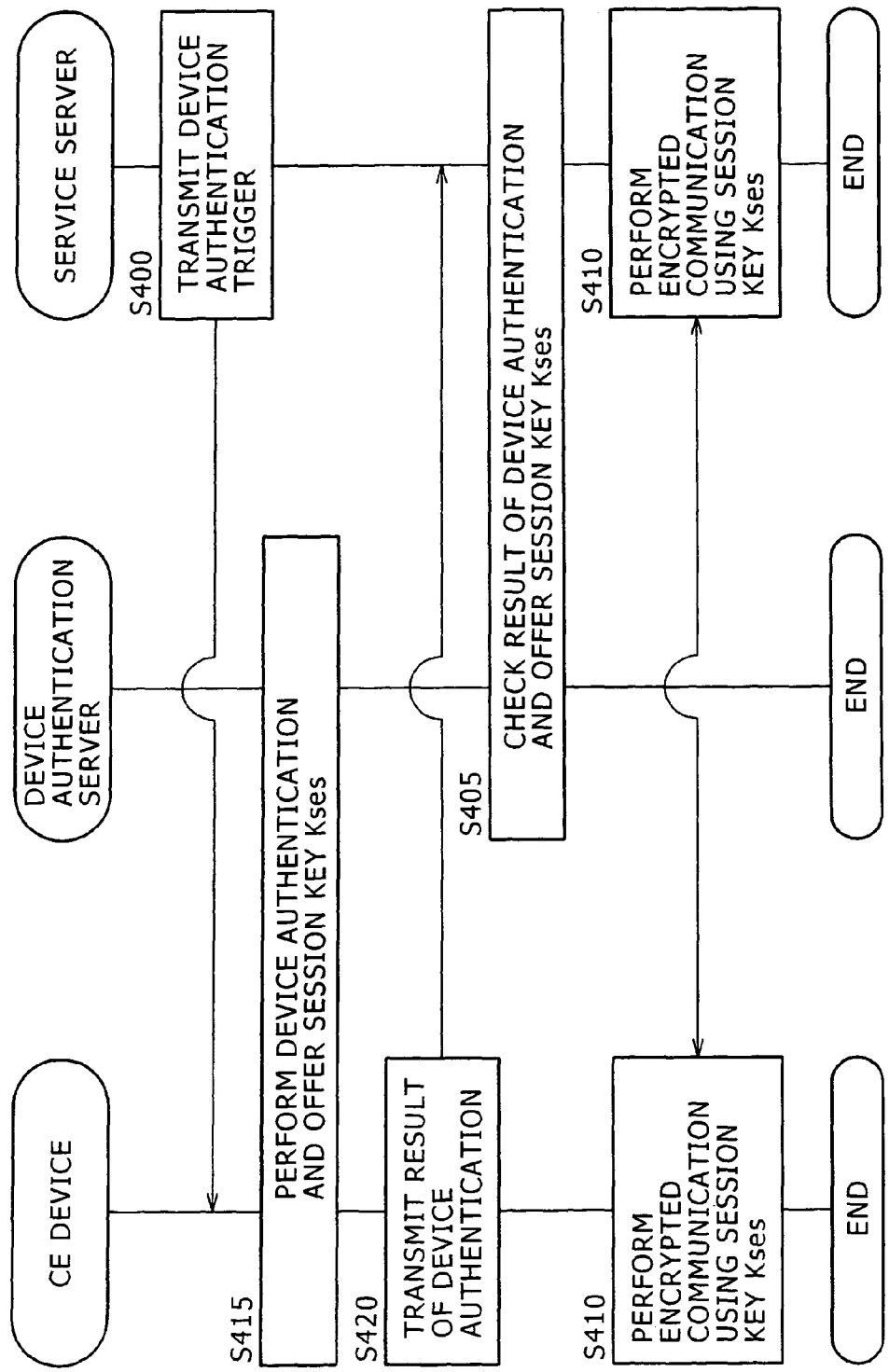
FIG. 8 is a flowchart of steps constituting a second variation of the invention for device authentication highlighting how a session key is delivered.

Described below with reference to the flowchart of FIG. 8 are the steps of the second variation in which the CE device 3 and service server 7 share the session key.

The structure of the device authentication system for the second variation is the same as that of the device authentication system 1 described earlier (FIG. 1).

The CE device 3 first accesses the service server 7 and makes a request to that server for its services.

In response, the service server 7 transmits a device authentication trigger to the CE device 3 (in step 400)

Upon receipt of the device authentication trigger from the service server 7, the CE device 3 gains access to the device authentication server 5. A device authentication process then takes place between the CE device 3 and the device authentication server 5.

After verifying through the device authentication process that the CE device 3 is a legitimate device, the device authentication server 5 offers a session key Kses to the CE device 3 by transmission (in step 415).

After completing the device authentication, the CE device 3 receives the result of the authentication from the device authentication server 5. The CE device 3 transfers the received result to the service server 7 (in step 420).

On receiving the result of the device authentication from the CE device 3, the service server 7 accesses the device authentication server 5.

The service server 7 sends to the device authentication server 5 the result of the authentication received from the CE device 3. A device authentication result checking process takes place between the service server 7 and the device authentication server 5.

If the result of the authentication is deemed valid by the device authentication result checking process, the device authentication server 5 offers the session key Kses to the service server 7 by transmission (in step 405).

The service server 7 receives the session key Kses from the device authentication server 5, and uses the received key to perform encrypted communication with the CE device 3 so as to provide the latter with services (in step 410).

The device authentication executed in step 415 above by the CE device 3 is the same as that in step 65 of FIG. 3.

The check on the result of the device authentication in step 405 is the same as that in step 55 of FIG. 3. The session key Kses is transmitted to the service server 7 along with the result of the check (in step 235 of FIG. 5).

With the second variation of the embodiment, as described above, the device authentication server 5 offers the session key Kses to the CE device 3 and service server 7. The CE device 3 and service server 7 use the received session key as the common key in carrying out encrypted communication therebetween.

The session key Kses is generated every time the result of device authentication is found valid. This arrangement enhances the level of security in communications between the CE device 3 and the service server 7.

(Third Variation)

A third variation of the present invention is designed to have a plurality of CE devices share a license (i.e., information including secret information such as a pass phrase as well as an expiration date) for license-based mutual authentication.

That is, the devices in possession of the same license are arranged to authenticate one another.

Following a successful mutual authentication process between two CE devices, one CE device may function as a client terminal and other as a server.

For example, suppose that a CE device A and a CE device B have authenticated each other and that the CE device A downloads software from the CE device B. In this case, the CE device A acts as a client terminal and the CE device B as a server.

Letting software be downloaded from one CE device to another reduces the amount of access to the server that is supposed to transfer the software between its clients. This arrangement appreciably reduces the load on the server.

By getting CE devices to share licenses, it is possible to sort these CE devices into groups by license so that particular services may be offered to particular groups of CE devices.

Illustratively, the CE devices of the same type are arranged to share a license so that these devices may be offered the services and content that can be shared only by the CE devices of the type in question.

Licenses may be issued dynamically online from a license server. This setup facilitates the updating of the licenses.

Figure 9:
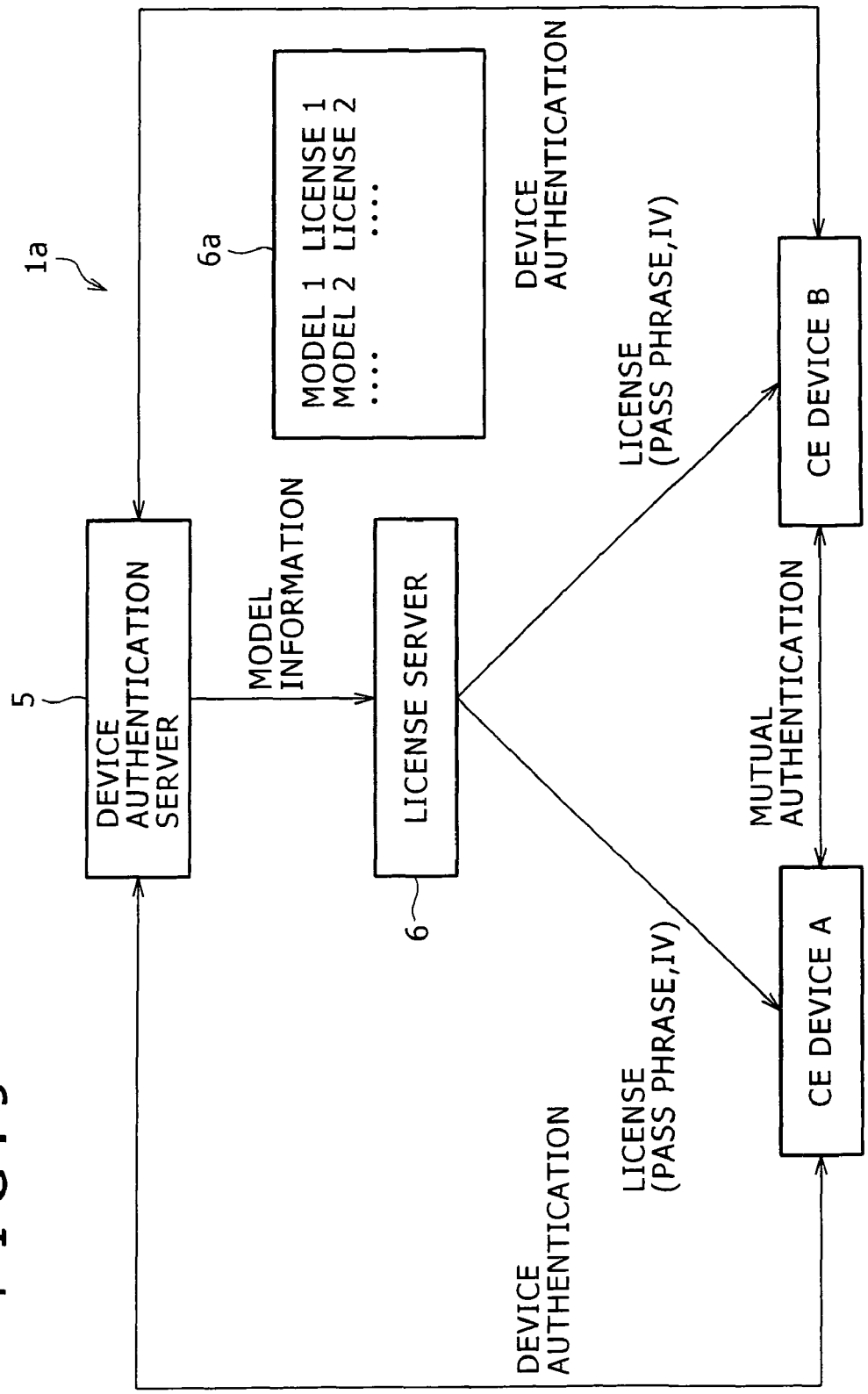
FIG. 9 is a schematic view showing a configuration of a device authentication system constituting a third variation of the invention for carrying out device authentication.

FIG. 9 is a schematic view showing a configuration of a device authentication system constituting a third variation of the present invention for carrying out device authentication.

In a device authentication system 1a of FIG. 9, a CE device A, a CE device B, a device authentication server 5, and a license server 6 are interconnected communicably over a network.

Whereas only two CE devices, A and B, are shown in FIG. 9 for purpose of illustration and simplification, more CE devices are usually configured. If there is no need to distinguish between the CE devices A and B in the description that follows, they will be collectively referred to as the CE device.

The device authentication server 5 authenticates the CE devices A and B. The procedure for device authentication is the same as that of the above-described embodiment of the invention.

The device authentication server 5 transmits the result of the check on the device authentication to a service server (not shown) as in the case of the above-described embodiment. The result of the check is also sent to the license server 6.

When transmitting the result of the check on the device authentication to the license server 6, the device authentication server 5 offers device type information about the CE devices to the license server 6.

The device authentication server 5 is arranged to transmit device type information to the license server 6. This action is needed because the license server 6 offers different licenses to different types of CE devices.

Whereas a license is shared by the CE devices of the same type according to the third variation of the invention, this is not limitative of the invention. Alternatively, a license may be shared by the CE devices having some other attribute in common (e.g., a user label registered by a CE device user with the device authentication system 1a).

In the case above, the device authentication server 5 offers the license server 6 information for identifying the attribute in question.

The license server 6 is a server that provides CE devices with licenses with which these device can authenticate one another.

The license server 6 has a license database 6a that retains the licenses corresponding to different types of CE devices. Given device type information from the device authentication server 5, the license server 6 checks the database 6a and transmits the retrieved license corresponding to the received information to the CE devices involved.

Each license may be so structured as to include secret information for allowing relevant CE devices to authenticate one another, as well as other pieces of information (e.g., expiration date, secret key for encrypting and decrypting data).

Illustratively, the third variation of the invention adopts a pass phrase for mutual authentication and an initial value IV for forming message blocks, as secret information for enabling the CE device involved to authenticate one another.

The CE devices A and B are each capable of performing device authentication with the device authentication server 5 and carrying out mutual authentication with other CE devices using the license provided by the license server 6.

When the CE devices A and B are arranged to authenticate each other, one of them may function as a server and the other as a client.

Figure 10:
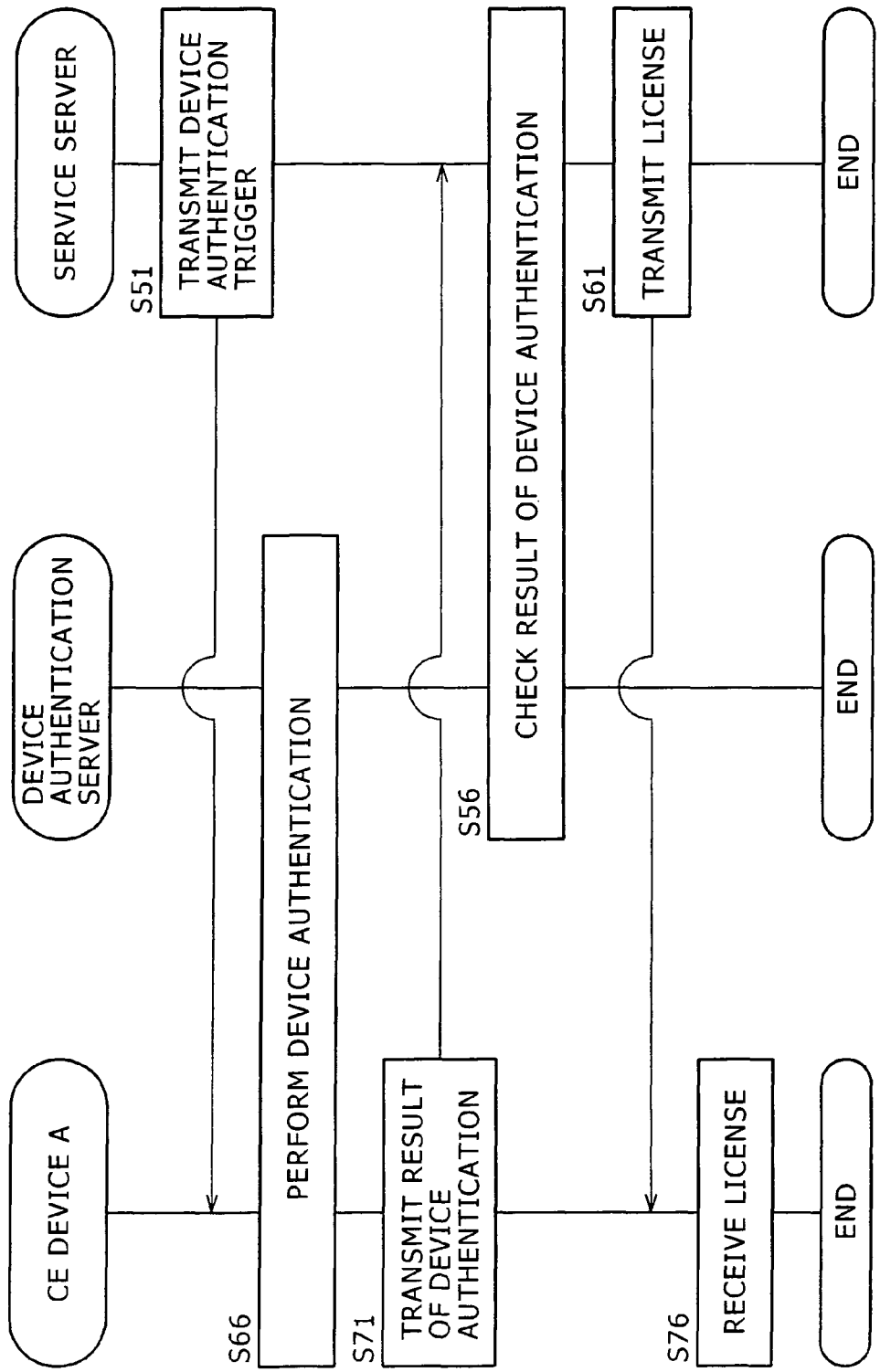
FIG. 10 is a flowchart of steps in which the service server implements the third variation of the invention in offering a license to a CE device.

FIG. 10 is a flowchart of steps constituting a procedure by which the service server 6 offers a license to the CE device A.

Comparing the flowchart of FIG. 10 with that of FIG. 3 shows that the license server 6 offers a license to the CE device A in the same manner that the service server 7 offers its services as explained above with reference to FIG. 3.

In other words, the license server 6 may be regarded as a service server that offers the service called licenses to the CE device.

What follows is a description of the flowchart in FIG. 10. The CE device A first accesses the license server 6 and makes a license offering request to that server.

A license is requested illustratively when the validity of a given license has expired or when the CE device A has yet to acquire that license.

On receiving the license offering request, the license server 6 transmits a device authentication trigger to the CE device A (in step 51).

Upon receipt of the device authentication trigger from the license server 6, the CE device A gains access to the device authentication server 5. A device authentication process takes place between the CE device A and the device authentication server 5 (in step 66).

The CE device A receives the result of the device authentication from the device authentication server 5, and sends the received result to the license server 6 (in step 71).

On receiving the result of the authentication from the CE device A, the license server 6 gains access to the device authentication server 5.

The license server 6 sends to the device authentication server 5 the result of the device authentication received from the CE device A. A device authentication result checking process takes place between the license server 6 and the device authentication server 5.

The device authentication server 5 transmits to the license server 6 both the result of the check on the device authentication and the device type information about the CE device A (in step 56).

The license server 6 receives the result of the check and the device type information from the device authentication server 5. Using the received device type information, the license server 6 searches for and acquires the corresponding license for the CE device A from the license database 6a. The license thus retrieved is transmitted to the CE device A (in step 61).

The CE device A receives the license from the license server 6 and stores it (in step 76).

Whereas the manner in which the CE device A acquires a license from the license server 6 was described above, the CE device B also obtains that license in like manner from the license server 6. Then the CE devices A and B can share the license therebetween.

Figure 11:
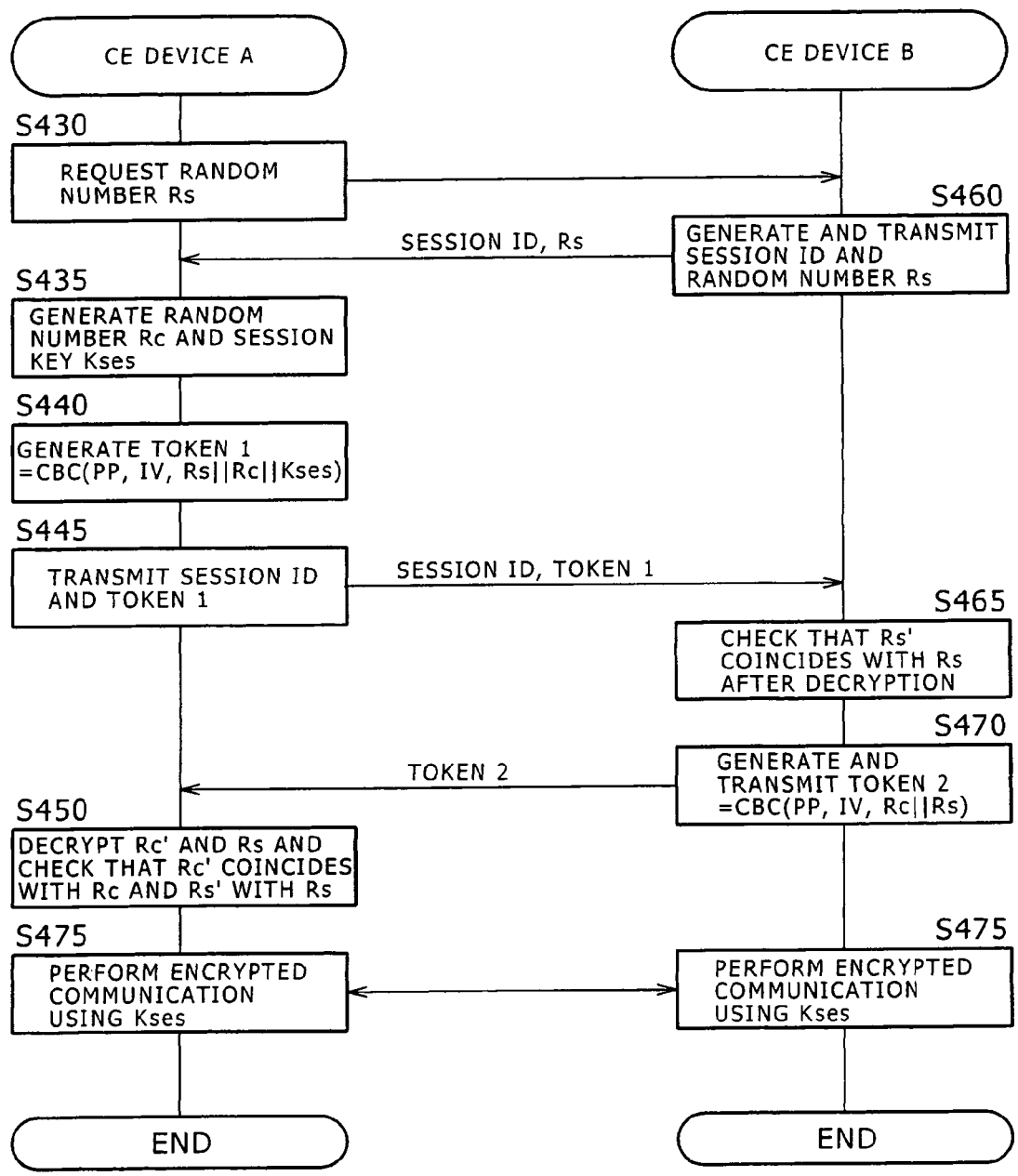
FIG. 11 is a flowchart of steps in which CE devices implement the third variation of the invention for mutual authentication.

Described below with reference to the flowchart of FIG. 11 are the steps in which the CE devices A and B sharing the same license authenticate each other.

For the ensuing description, it is assumed that the CE device A requests service offerings from the CE device B (e.g., CE device A is set to download software from the CE device B following mutual authentication). In this case, the CE device A acts as a client terminal and the CE device B as a server.

The CE device A first requests the CE device B to transmit a random number Rs (in step 430).

On receiving the request, the CE device B generates a session ID and a 128-bit random number Rs and sends them to the CE device A (in step 460). The CE device B stores the random number Rs and session ID in combination.

The random number Rs constitutes server-specific information that is unique to the CE device B.

The CE device A receives and stores the session ID and random number Rs from the CE device B, and generates a random number Rc and a session key Kses, 128 bits long each (in step 435). The random number Rc constitutes terminal-specific information that is unique to the CE device A.

The CE device A then generates a token 1 defined by the expression (18) below (in step 440):

$$\text{token 1} = CBC(PP, IV, Rs \| Rc \| Kses) \tag{18}$$

where, PP represents the pass phrase for mutual authentication and IV denotes the initial value for message blocks, PP and IV being included in the license.

The CE device A sends to the CE device B the session ID received from the CE device B and the token 1 generated in the preceding step (in step 445).

The CE device B receives these pieces of information from the CE device A. Using the session ID, the CE device B identifies the session with which the received pieces of information are associated. The combination of the previously stored session ID with the corresponding random number Rs allows the CE device B to identify the random number Rs issued to the CE device A.

The CE device B then decrypts the token 1 using the pass phrase PP for mutual authentication and the initial value IV, both included in the license, thereby acquiring the random numbers Rs and Rc.

The CE device B has advance knowledge that the information "Rs∥Rc∥Kses" obtained from the decrypted token 1 is formed by connecting the random number Rs, random number Rc, and session key Kses and that each of them has a predetermined number of bits (i.e., 128 bits). Based on that knowledge, the CE device B can extract the random number Rs', random number Rc', and session key Kses' from the information "Rs∥Rc∥Kses" acquired from the decrypted token 1.

The CE device B then checks to determine whether the acquired random number Rs' matches the previously generated random number Rs (in step 465).

A match between the two random numbers enables the CE device B to ascertain (using device authenticating means) that the CE device A retains the pass phrase PP. The CE device B then recognizes the session key Kses' as Kses, i.e., as the legitimate session key issued by the CE device A.

A mismatch between the random number Rs' and the random number Rs prompts the CE device B to conclude that the CE device A is not in possession of the pass phrase PP. In this case, the CE device B finds the device authentication process unsuccessful and aborts it accordingly.

When the random numbers Rs' and Rs are found to match, the CE device B generates a token 2 defined by the expression (19) below and sends it to the CE device A (in step 470) The expression defining the token 2 is as follows:

$$\text{token 2} = CBC(PP, IV, Rc \| Rs) \tag{19}$$

The CE device A receives the token 2 from the CE device B. Using the pass phrase PP and initial value IV, the CE device A decrypts the received token 2 and acquires information "Rc∥Rs."

The CE device A has advance knowledge that the acquired information is formed by connecting the pieces of information Rc' and Rs', 128 bits long each, in that order. The knowledge enables the CE device A to obtain the random numbers Rc' and Rs' from the decrypted token 2.

The CE device A then checks to determine whether the acquired random number Rc' matches the previously generated random number Rc.

A match between the two random numbers allows the CE device A to ascertain (using server authenticating means) that the CE device B retains the pass phrase PP. In this case, the CE device A continues the device authentication process.

A mismatch between the random numbers Rc' and Rc prompts the CE device A to conclude that the CE device A is not in possession of the pass phrase PP. In this case, the CE device A finds the device authentication process unsuccessful and aborts it accordingly.

With this variation, another check is made to determine whether the random number Rs' matches the random number Rs sent in step 470 from the CE device B (in step 450). This step is carried out to improve the level of security further.

After the CE device A has checked that the random number Rc' coincides with the random number Rc and the random number Rs' with the random number Rs, the CE devices A and B start encrypted communication using the session key Kses (in step 475).

Thereafter, the CE device A can receive from the CE device B such services as the download of software. Conversely, the CE device B may receive services from the CE device A.

In the steps described above, the CE devices A and B authenticate each other using the shared license information. They can also share the session key Kses.

In the foregoing description, the CE device A was shown generating the session key Kses and offering it to the CE device B. However, this is not limitative of the present invention. Alternatively, the CE device B may be arranged to generate the session key Kses and provide it to the CE device A.

In the alternative arrangement above, the session key Kses is not generated in step 435. That means the session key Kses is not included in the token 1 in step 440.

Instead, the CE device B checks in step 465 to determine whether the random number Rs' matches the random number Rs. After the successful check, the CE device B generates the session key Kses and has it included in the token 2 in step 470 for transmission to the CE device A.

In turn, the CE device A decrypts the token 2 and acquires the session key Kses from what has been decrypted.

As another alternative, the token 2 may be generated in step 470 of FIG. 11 in such a manner that it contains the session key Kses as defined by the expression (20) below:

$$\text{token 2} = CBC(PP, IV, Rc \| Rs \| Kses) \tag{20}$$

Preparing the token 2 in the above manner increases the amount of information it is supposed to carry. This makes it even more difficult for a third party to decrypt the token 2 illicitly.

Figure 12:
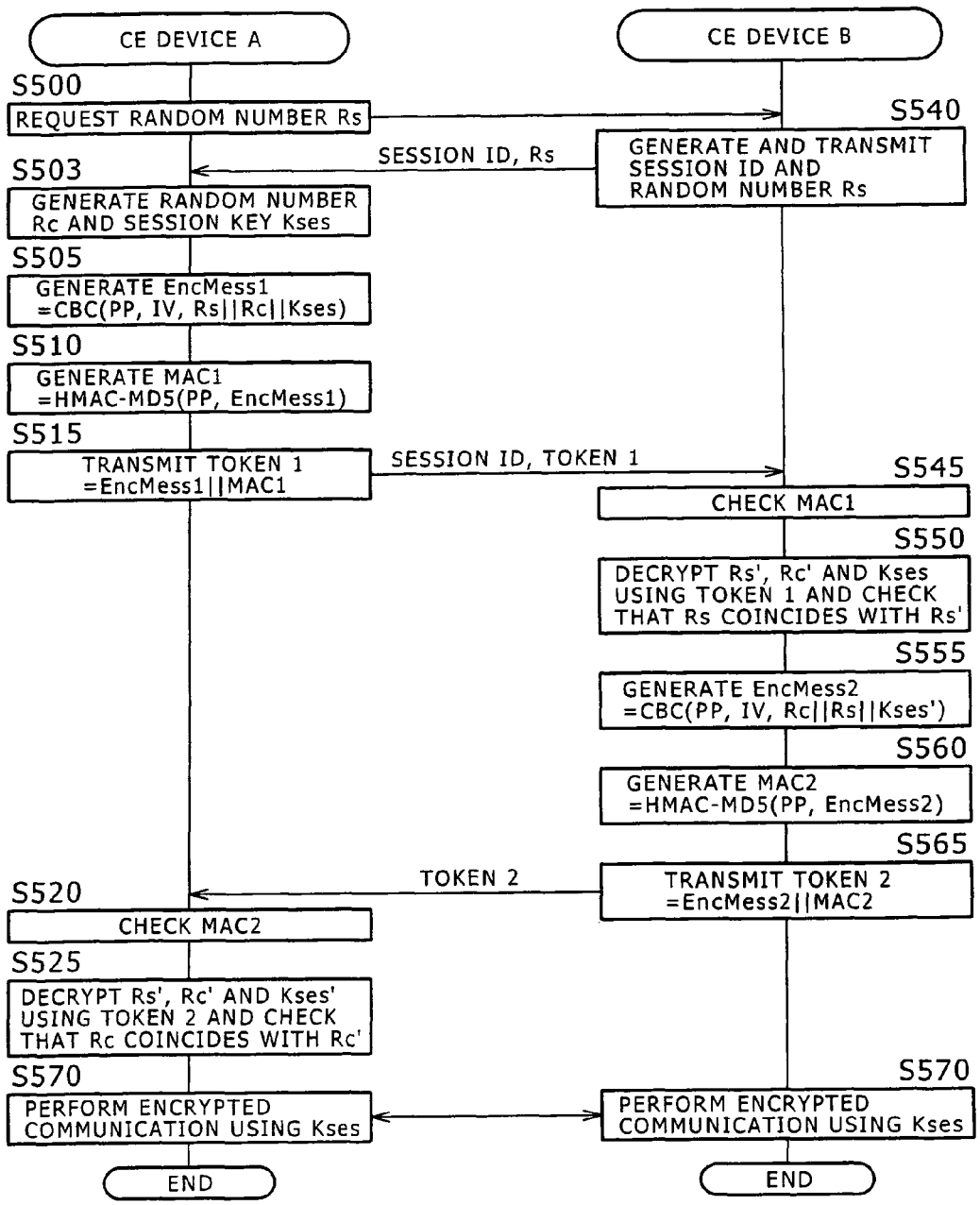
FIG. 12 is a flowchart of other steps in which CE devices implement the third variation of the invention for mutual authentication.

Described below with reference to the flowchart of FIG. 12 is an example of MAC-based mutual authentication between devices. The use of MAC for device authentication further improves the level of security.

The CE device A first requests the CE device B to transmit a random number Rs (in step 500).

On receiving the request, the CE device B generates a session ID and a 128-bit random number Rs and sends them to the CE device A (in step 540). The CE device B stores the random number Rs and session ID in combination.

The CE device A receives and stores the session ID and random number Rs from the CE device B, and generates accordingly a random number Rc and a session key Kses, 128 bits long each (in step 503).

The CE device A proceeds to generate an encrypted message EncMess1 defined by the expression (21) below (in step 505):

$$EncMess1 = CBC(PP, IV, Rs \| Rc \| Kses) \tag{21}$$

The CE device A then generates MAC1 defined by the expression (22) below (in step 510):

$$MAC1 = HMAC\text{-}MD5(PP, EncMess1) \tag{22}$$

where, HMAC-MD5 is one variety of MAC and constitutes a hash function.

More specifically, MAC1 is the last of the blocks formed by encrypting the message EncMess1 in HMAC-MD5 using the pass phrase PP.

The CE device A proceeds to connect the message EncMess1 and MAC1, in that order, to generate a token 1 defined by the expression (23) below and sends it to the CE device B (in step 515). The expression defining the token 1 is as follows:

$$\text{token 1} = EncMess1 \| MAC1 \tag{23}$$

The CE device B receives the token 1 from the CE device A. From the token 1, the CE device B acquires the message EncMess1 and MAC1.

The CE device B then verifies MAC1 (in step 545). That is, the CE device B encrypts the message EncMess1 in HMAC-MD5 using the pass phrase PP, the message EncMess1 having been extracted from the token 1. The CE device B checks to determine whether MAC1 coincides with the last of the information blocks acquired from the encryption.

On finding the two pieces of information to coincide with each other, the CE device B ascertains that the message EncMess1 is valid.

That is, a match between the two pieces of information enables the CE device B to continue the authentication process; a mismatch prompts the CE device B to find the authentication process unsuccessful and abort it accordingly.

After verifying MAC1, the CE device B decrypts the random numbers Rs' and Rc' as well as the session key Kses' from the message EncMess1 using the pass phrase PP.

The CE device B proceeds to determine whether the random number Rs sent earlier to the CE device A coincides with the random number Rs' decrypted from EncMess1 (in step 550).

A match between the two random numbers enables the CE device B to ascertain that the CE device A is in possession of the pass phrase PP for mutual authentication and that the session key Kses' is a legitimate key.

A mismatch between the random numbers Rs and Rs' prompts the CE device B to conclude that the device authentication is unsuccessful. In this case, the CE device B aborts the authentication process.

The CE device B then generates an encrypted message EncMess2 defined by the expression (24) below (in step 550):

$$EncMess2 = CBC(PP, IV, Rc \| Rs \| Kses) \tag{24}$$

The CE device A proceeds to generate MAC2 defined by the expression (25) below (in step 560):

$$MAC2 = HMAC\text{-}MD5(PP, EncMess2) \tag{24}$$

The CE device B then generates a token 2 by connecting the message EncMess2 and MAC2, in that order, and sends the token 2 defined by the expression (25) below to the CE device A (in step 565):

$$\text{token 2} = EncMess2 \| MAC2 \tag{25}$$

The CE device A receives the token 2 from the CE device B. From the received token 2, the CE device acquires the message EncMess2 and MAC2.

The CE device A proceeds to verify MAC2 (in step 520). More specifically, the CE device A encrypts the message EncMess2 in HMAC-MD5 using the pass phrase PP, the message EncMess2 having been extracted from the token 2. The CE device A further checks to determine whether MAC2 coincides with the last of the information blocks acquired from the encryption.

On finding the two pieces of information to match, the CE device A ascertains that the message EncMess2 is valid.

That is, a match between the two pieces of information enables the CE device A to continue the authentication process; a mismatch prompts the CE device A to find the authentication process unsuccessful and abort it accordingly.

After verifying MAC2, the CE device A decrypts the random numbers Rc' and Rs' as well as the session key Kses' from the message EncMess2 using the pass phrase PP.

A check is then made to determine whether the random number Rc and session key Kses both sent earlier to the CE device A coincide respectively with the random number Rc' and session key Kses' decrypted from EncMess2 (in step 525).

In the case of a match between all corresponding pieces of information, it is ascertained that the CE device A is in possession of the pass phrase PP.

After the successful mutual authentication, the CE devices A and B perform encrypted communication therebetween using the session key Kses (in step 570).

The above-described third variation of the present invention provides the following major effects:

(1) A plurality of CE devices are arranged to share license-based secret information. This enables the CE devices to authenticate one another on a peer-to-peer basis.

(2) The CE devices allowed to share secret information may be divided into groups illustratively by device type. The CE devices of a given group may then be provided with services and content which can be shared only within that group.

(3) Licenses may be managed online by the license server 6 in dynamic fashion. This makes it appreciably easy to update the licenses.

INDUSTRIAL APPLICABILITY

The present invention allows CE devices to be authenticated by the common key system.

The invention claimed is:

1. A device authentication system, comprising:
a terminal device which stores predetermined secret information;
a device authentication server which stores said secret information and authenticates said terminal device; and
a service server which offers services to said terminal device authenticated by said device authentication server,
wherein said device authentication server authenticates said terminal device by checking that server-specific information generated by said device authentication server is correctly encrypted by said terminal device using said secret information, and said terminal device authenticates said device authentication server by checking that terminal-specific information generated by said terminal device and encrypted using said secret information is correctly decrypted by said device authentication server;
either said terminal device or said device authentication server generates a session key following the authentication, encrypts said session key using said secret information, and transmits the encrypted session key to the other device so as to share said session key therebetween;
said device authentication server, using said session key, encrypts certificate information for certifying that said terminal device has been authenticated and transmits the certificate information to said terminal device;
said terminal device acquires said certificate information sent from said device authentication server by decrypting said encrypted certificate information using said session key, and transmits the acquired certificate information to said service server;
said service server receives said certificate information from said terminal device and transmits the received certificate information to said device authentication server prompting said device authentication server to check that said certificate information is valid;
said certificate information includes identification information with which said device authentication server identifies a result of the device authentication of said terminal device and encrypted identification information generated by encrypting said identification information using a server key specific to said device authentication server; and
said device authentication server, using said server key, decrypts said certificate information received from said service server so as to acquire said encrypted identification information included in said certificate information, and determines whether said certificate information is valid by checking that the acquired identification information coincides with the identification information included in the received certificate information.

2. The device authentication system according to claim 1, wherein said service server offers said services to said terminal device after causing said device authentication server to check that said certificate information sent from said terminal device is valid.

3. The device authentication system according to claim 1, wherein either said terminal device or said device authentication server generates a second session key, encrypts said second session key using said secret information, and transmits the encrypted session key to the other device so as to share said second session key therebetween;
wherein said device authentication server converts said certificate information through a predetermined procedure using said second session key into detection information for detecting that said certificate information was not corrupted during communication, and transmits said detection information generated by the conversion to said terminal device; and
wherein said terminal device converts said acquired certificate information through said predetermined procedure using said second session key into detection information, and determines whether said received certificate information is not corrupted by checking that said detection information generated by the conversion coincides with the detection information received from said device authentication server.

4. A device authentication server used in a device authentication system including a terminal device which stores predetermined secret information, a device authentication server which stores said secret information and authenticates said terminal device, and a service server which offers services to said terminal device authenticated by said device authentication server, said device authentication server comprising:
request accepting means for accepting a request for device authentication from said terminal device;
server-specific information transmitting means for transmitting server-specific information generated by said device authentication server to said terminal device from which said request is accepted;
encrypted server-specific information receiving means for receiving from said terminal device said server-specific information encrypted by use of said secret information;
device authenticating means for authenticating said terminal device by checking that the encrypted server-specific information received is correctly decrypted using said secret information;

session key acquiring means for acquiring a session key to be shared with said terminal device, said session key being acquired either by receiving said session key from said terminal device in encrypted form based on a secret key in order to decrypt the received session key using said secret key, or by generating said session key and encrypting the generated session key using said secret key before transmitting the encrypted session key to said terminal device;

certificate information transmitting means for transmitting to said terminal device certificate information for certifying that said terminal device has been authenticated by said device authenticating means, said certificate information being encrypted using the acquired session key for the transmission;

certificate information receiving means for receiving said certificate information from said service server which has acquired said certificate information from said terminal device;

check result transmitting means for checking that said certificate information sent from said service server is valid and for transmitting a result of the check to said service server, wherein said certificate information includes identification information which identifies the result of the device authentication of said terminal device, and encrypted identification information generated by encrypting said identification information using a server key specific to said device authentication server;

encrypted identification information decrypting means for decrypting said encrypted identification information using said server key, said encrypted identification information being included in said certificate information received from said service server;

determining means for determining whether the decrypted identification information coincides with the identification information included in the received certificate information; and device authentication result identifying means for identifying the result of the device authentication using the identification information, wherein said check result transmitting means transmits said result of said device authentication identified by said device authentication result identifying means.

5. The device authentication server according to claim 4, further comprising:

terminal-specific information receiving means for receiving from said terminal device terminal-specific information generated by said terminal device and encrypted using said secret information; and terminal-specific information transmitting means for transmitting to said terminal device said terminal-specific information acquired by decrypting the received terminal-specific information using said secret information.

6. The device authentication server according to claim 4, further comprising:

second session key acquiring means for acquiring a second session key to be shared with said terminal device, said second session key being acquired either by receiving said second session key from said terminal device in encrypted form based on said secret key in order to decrypt the received second session key using said secret key, or by generating said second session key and encrypting the generated second session key using said secret key before transmitting the encrypted second session key to said terminal device; and detection information generating means for generating detection information for detecting that said certificate information was not corrupted during communication, said detection information being generated by conversion from said certificate information through a predetermined procedure using said second session key;

wherein said certificate information transmitting means transmits said detection information generated by said detection information generating means to said terminal device together with said certificate information.

7. The device authentication server according to claim 4, further comprising:

correspondence storing means for storing a correspondence between a device ID of said terminal device and the secret information stored by said terminal device;

device ID receiving means for receiving the device ID from the terminal device from which said request has been accepted; and secret information identifying means for identifying the secret information corresponding to said device ID by searching for the received device ID through said correspondence storing means;

wherein said device authenticating means encrypts said server-specific information using the identified secret information.

8. A terminal device used in a device authentication system including a terminal device which stores predetermined secret information, a device authentication server which stores said secret information and authenticates said terminal device, and a service server which offers services to said terminal device authenticated by said device authentication server, said terminal device comprising:

requesting means for requesting device authentication from said device authentication server;

encrypted server-specific information transmitting means for transmitting to said device authentication server server-specific information sent from said device authentication server in response to said request, said server-specific information being encrypted using said secret information for the transmission;

session key acquiring means for acquiring a session key to be shared with said device authentication server, said session key being acquired either by receiving said session key from said device authentication server in encrypted form based on a secret key in order to decrypt the received session key using said secret key, or by generating said session key and encrypting the generated session key using said secret key before transmitting the encrypted session key to said device authentication server;

certificate information receiving means for receiving from said device authentication server certificate information for certifying that said terminal device has been authenticated by said device authentication server, said certificate information being encrypted using said session key; and certificate information transmitting means for transmitting the received certificate information to said service server after decrypting the encrypted certificate information using said session key, wherein said certificate information includes identification information which identifies the result of the device authentication of said terminal device, and encrypted identification information generated by encrypting said identification information using a server key specific to said device authentication server.

9. The terminal device according to claim 8, further comprising:
terminal-specific information transmitting means for transmitting to said device authentication server terminal-specific information generated and encrypted using said secret information; and
server authenticating means for authenticating said device authenticating server by checking that the transmitted terminal-specific information has been decrypted by said device authentication server.

10. The terminal device according to claim 8, further comprising:
second session key acquiring means for acquiring a second session key to be shared with said device authentication server, said second session key being acquired either by receiving said second session key from said device authentication server in encrypted form based on said secret key in order to decrypt the received second session key using said secret key, or by generating said second session key and encrypting the generated second session key using said secret key before transmitting the encrypted second session key to said device authentication server;
detection information receiving means for receiving from said device authentication server detection information for detecting that said certificate information was not corrupted during communication, said detection information being generated by conversion from said certificate information through a predetermined procedure using said second session key;
detection information generating means for generating detection information by conversion from the received certificate information through said predetermined procedure using the acquired second session key; and
determining means for determining whether said received certificate information is not corrupted by checking that the generated detection information coincides with the received detection information.

11. A device authentication method for use with a device authentication server used in a device authentication system including a terminal device which stores predetermined secret information, a device authentication server which stores said secret information and authenticates said terminal device, and a service server which offers services to said terminal device authenticated by said device authentication server,
wherein said certificate information includes identification information which identifies a result of the device authentication of said terminal device, and encrypted identification information generated by encrypting said identification information using a a server key specific to said device authentication server, said device authentication method comprising the steps of:
accepting a request for device authentication from said terminal device;
transmitting server-specific information generated by said device authentication server to said terminal device from which said request is accepted;
receiving from said terminal device said server-specific information encrypted by use of said secret information;
authenticating said terminal device by checking that the encrypted server-specific information received is correctly decrypted using said secret information;
acquiring a session key to be shared with said terminal device, said session key being acquired either by receiving said session key from said terminal device in encrypted form based on a secret key in order to decrypt the received session key using said secret key, or by generating said session key and encrypting the generated session key using said secret key before transmitting the encrypted session key to said terminal device;
transmitting to said terminal device certificate information for certifying that said terminal device has been authenticated, said certificate information being encrypted using the acquired session key for the transmission;
receiving said certificate information from said service server which has acquired said certificate information from said terminal device;
checking that said certificate information is valid and to transmit a result of the check to said service server;
decrypting said encrypted identification information using said server key, said encrypted identification information being included in said certificate information received from said service server;
determining whether the decrypted identification information coincides with the identification information included in the received certificate information; and
identifying the result of the device authentication using the identification information determined earlier,
wherein said check result transmitting step transmits said result of said device authentication identified in said device authentication result identifying step.

12. The device authentication method according to claim 11, wherein said device authentication server includes a terminal-specific information receiving means and terminal-specific information transmitting means, said device authentication method further comprising the steps of:
receiving from said terminal device terminal-specific information generated by said terminal device and encrypted using said secret information; and
transmitting to said terminal device said terminal-specific information acquired by decrypting the received terminal-specific information using said secret information.

13. The device authentication method according to claim 11, wherein said device authentication server includes a second session key acquiring means and detection information generating means, said device authentication method further comprising the steps of:
acquiring a second session key to be shared with said terminal device, said second session key being acquired either by receiving said second session key from said terminal device in encrypted form based on said secret key in order to decrypt the received second session key using said secret key, or by generating said second session key and encrypting the generated second session key using said secret key before transmitting the encrypted second session key to said terminal device; and
generating detection information for detecting that said certificate information was not corrupted during communication, said detection information being generated by conversion from said certificate information through a predetermined procedure using said second session key,
wherein said certificate information transmitting step transmits said detection information generated in said detection information generating step to said terminal device together with said certificate information.

14. The device authentication method according to claim 11, further comprising the steps of:
storing a correspondence between a device ID of said terminal device and the secret information stored by said terminal device;

receiving the device ID from the terminal device from which said request has been accepted; and identifying the secret information corresponding to said device ID by searching for the received device ID through said stored correspondence, wherein said device authenticating step encrypts said server-specific information using the identified secret information.

15. A device authentication method for use with a terminal device used in a device authentication system including a terminal device which stores predetermined secret information, a device authentication server which stores said secret information and authenticates said terminal device, and a service server which offers services to said terminal device authenticated by said device authentication server, said device authentication method comprising the steps of:

requesting device authentication from said device authentication server;

transmitting to said device authentication server server-specific information sent from said device authentication server in response to said request, said server-specific information being encrypted using said secret information for the transmission;

requiring a session key to be shared with said device authentication server, said session key being acquired either by receiving said session key from said device authentication server in encrypted form based on a secret key in order to decrypt the received session key using said secret key, or by generating said session key and encrypting the generated session key using said secret key before transmitting the encrypted session key to said device authentication server;

receiving from said device authentication server certificate information for certifying that said terminal device has been authenticated by said device authentication server, said certificate information being encrypted using said session key;

transmitting the received certificate information to said service server after decrypting the encrypted certificate information using said session key, wherein said certificate information includes identification information which identifies the result of the device authentication of said terminal device, and encrypted identification information generated by encrypting said identification information using a server key specific to said device authentication server.

16. The device authentication method according to claim 15, further comprising the steps of:

transmitting to said device authentication server terminal-specific information generated and encrypted using said secret information; and authenticating said device authenticating server by checking that the transmitted terminal-specific information has been decrypted by said device authentication server.

17. The device authentication method according to claim 15, further comprising the steps of:

acquiring a second session key to be shared with said device authentication server, said second session key being acquired either by receiving said second session key from said device authentication server in encrypted form based on said secret key in order to decrypt the received second session key using said secret key, or by generating said second session key and encrypting the generated second session key using said secret key before transmitting the encrypted second session key to said device authentication server;

receiving from said device authentication server detection information for detecting that said certificate information was not corrupted during communication, said detection information being generated by conversion from said certificate information through a predetermined procedure using said second session key;

generating detection information by conversion from the received certificate information through said predetermined procedure using the acquired second session key; and determining whether said received certificate information is not corrupted by checking that the generated detection information coincides with the received detection information.

* * * * *